(12) United States Patent
Jang et al.

(10) Patent No.: US 10,746,914 B2
(45) Date of Patent: Aug. 18, 2020

(54) OPTICAL MEMBER AND DISPLAY DEVICE INCLUDING THE SAME

(71) Applicant: Samsung Display Co., Ltd., Yongin-si (KR)

(72) Inventors: Yun Jang, Asan-si (KR); Byung Seo Yoon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/214,135

(22) Filed: Dec. 10, 2018

(65) Prior Publication Data
US 2019/0377119 A1  Dec. 12, 2019

(30) Foreign Application Priority Data

Jun. 11, 2018 (KR) .................. 10-2018-0066748

(51) Int. Cl.
*F21V 8/00* (2006.01)
(52) U.S. Cl.
CPC ............. *G02B 6/003* (2013.01); *G02B 6/005* (2013.01)
(58) Field of Classification Search
CPC ..................................................... G02B 6/003
See application file for complete search history.

(56) References Cited

U.S. PATENT DOCUMENTS

| 8,033,706 B1* | 10/2011 | Kelly ................... G02B 6/0036 362/307 |
| 2007/0177262 A1 | 8/2007 | Maekawa et al. |
| 2013/0033901 A1* | 2/2013 | Nishitani ............. G02B 6/0036 362/613 |
| 2016/0300535 A1 | 10/2016 | Gilbert et al. |
| 2018/0004041 A1* | 1/2018 | Shin .................. G02F 1/133603 |

FOREIGN PATENT DOCUMENTS

| JP | 09-211232 | 8/1997 |
| JP | 09211232 A | * 8/1997 |
| JP | 2016-181474 | 10/2016 |

* cited by examiner

*Primary Examiner* — Evan P Dzierzynski
*Assistant Examiner* — Keith G. Delahoussaye
(74) *Attorney, Agent, or Firm* — H.C. Park & Associates, PLC

(57) ABSTRACT

An optical member and a display device, the optical member including a light guide plate; a low refractive index layer disposed on a top surface of the light guide plate; a first optical pattern layer disposed on a bottom surface of the light guide plate; and a second optical pattern layer disposed to cover a light-incident surface of the light guide plate. The second optical pattern layer includes a focusing lens structure.

20 Claims, 19 Drawing Sheets

OPTICAL MEMBER AND DISPLAY DEVICE INCLUDING THE SAME

CROSS REFERENCE TO RELATED APPLICATION

This application claims priority from and the benefit of Korean Patent Application No. 10-2018-0066748, filed on Jun. 11, 2018, which is hereby incorporated by reference for all purposes as if fully set forth herein.

BACKGROUND

Field

Exemplary embodiments of the invention relate generally to an optical member and a display device including the same and, more specifically, to an optical member including a light guide plate and a liquid crystal display (LCD) device including the optical member.

Discussion of the Background

A liquid crystal display (LCD) device receives light from a backlight assembly and displays an image using the received light. The backlight assembly includes a light source and a light guide plate. The light guide plate receives light provided by the light source and guides the received light to travel toward a display panel. The light provided by the light source may be white light, and the white light may be filtered through color filters provided in the display panel, thereby realizing various colors. In order to improve the picture quality (e.g., color reproducibility) of the LCD device, research has been conducted regarding ways to apply a wavelength conversion material. Generally, a blue light source may be used as the light source, and the wavelength conversion material may be disposed above the light guide plate to convert blue light into white light.

The angular distribution of light guided by the light guide plate, which uses a total reflection phenomenon, is determined by the difference in refractive index at an interface. The smaller the difference in refractive index at an interface, the greater the critical angle for total reflection. Thus, light incident at an angle smaller than the critical angle for total reflection is not totally reflected and is thus, not guided by the light guide plate.

The above information disclosed in this Background section is only for understanding of the background of the inventive concepts, and, therefore, it may contain information that does not constitute prior art.

SUMMARY

Exemplary embodiments of the present invention provide an optical member capable of improving the luminance of a display device by improving light leakage at a light-incident part.

Exemplary embodiments of the present invention also provide a display device including an optical member capable of improving light leakage at a light-incident part.

Additional features of the inventive concepts will be set forth in the description which follows, and in part will be apparent from the description, or may be learned by practice of the inventive concepts.

An exemplary embodiment of the present invention provides an optical member including a light guide plate; a low refractive index layer disposed on a top surface of the light guide plate; a first optical pattern layer disposed on a bottom surface of the light guide plate; and a second optical pattern layer disposed to cover a light-incident surface of the light guide plate. The second optical pattern layer includes a focusing lens structure.

Another exemplary embodiment of the present invention provides a display device including an optical member including a light guide plate, a low refractive index layer disposed on a top surface of the light guide plate, a wavelength conversion layer disposed on a top surface of the low refractive layer, a first optical pattern layer disposed on a bottom surface of the light guide plate, and a second optical pattern layer disposed to cover a light-incident surface of the light guide plate, the second optical pattern layer including a focusing lens structure; a light source disposed on at least one side of the light guide plate; and a display panel disposed above the optical member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
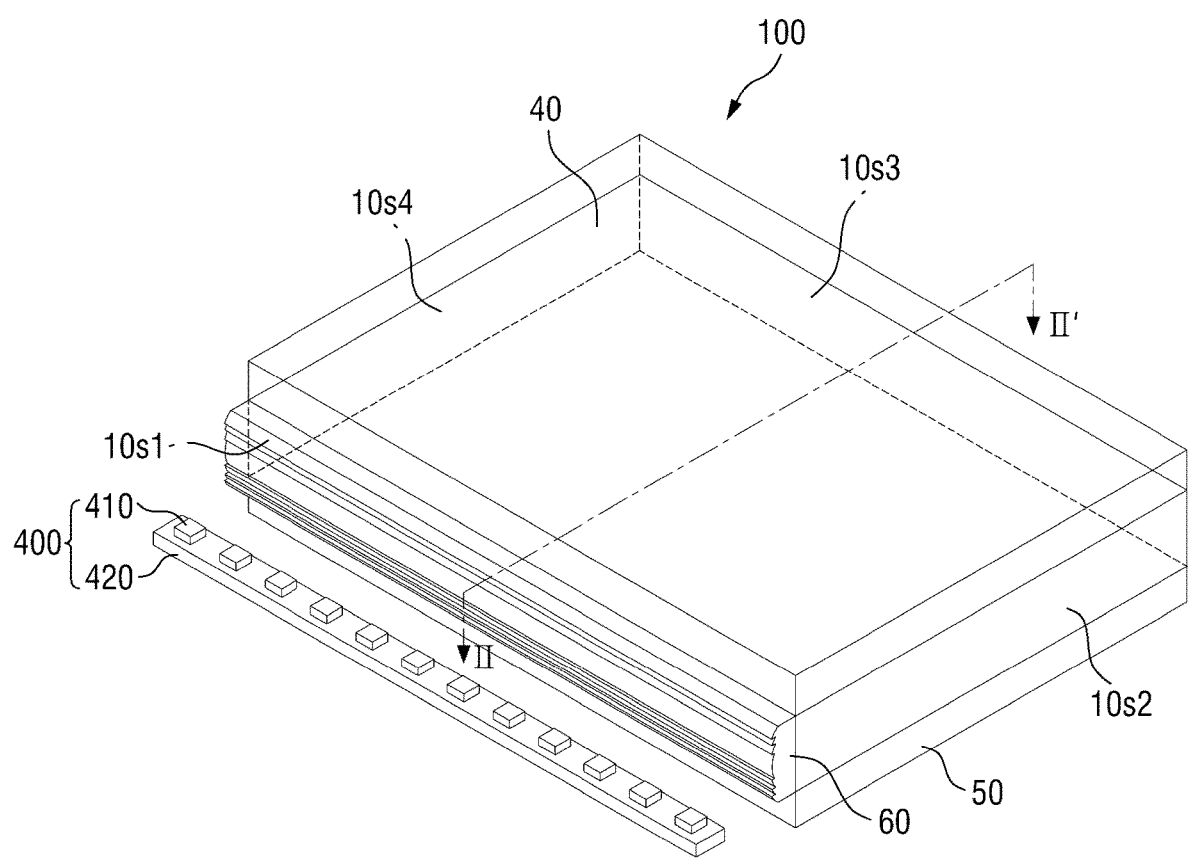
FIG. 1 is a perspective view illustrating an optical member and a light source according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
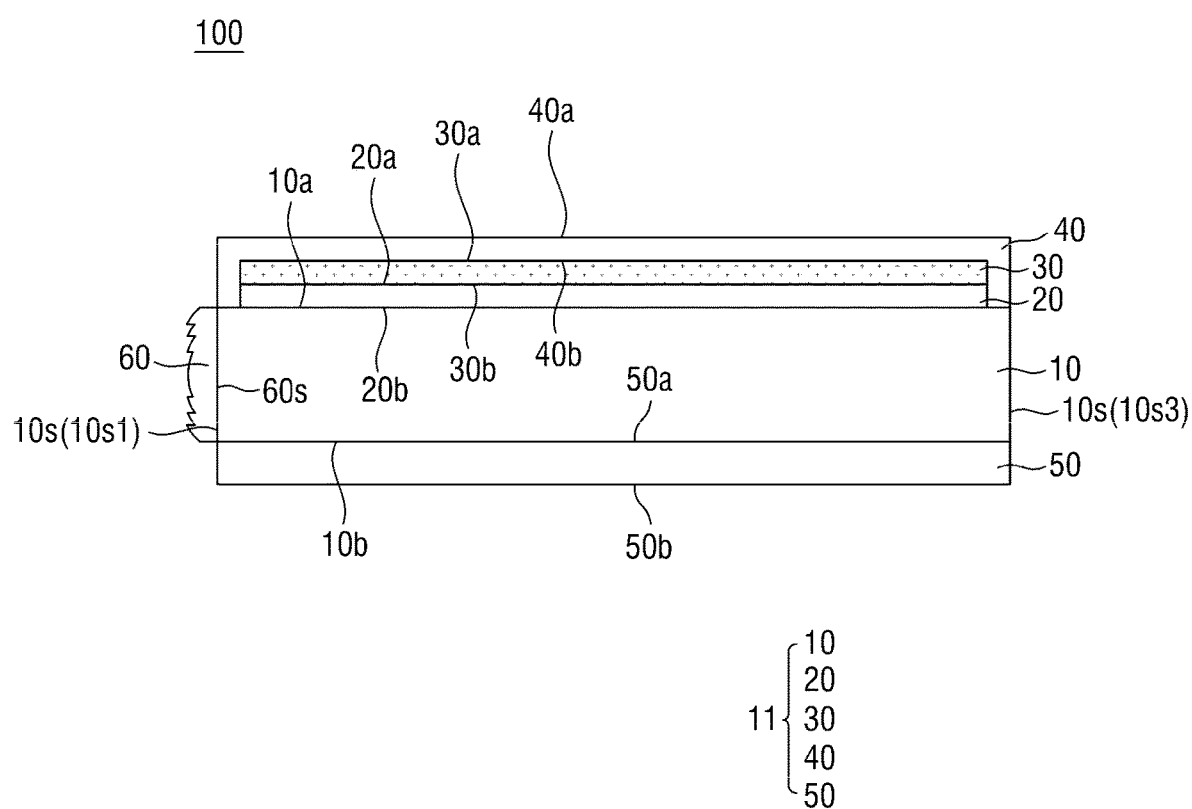
FIG. 2 is a cross-sectional view taken along line II-II' of FIG. 1.

FIG. 1 is a perspective view illustrating an optical member and a light source according to an exemplary embodiment of the present invention. FIG. 2 is a cross-sectional view taken along line II-II' of FIG. 1.

Referring to FIGS. 1 and 2, an optical member 100 includes a light guide plate 10, a low refractive index layer 20 disposed on the light guide plate 10, a wavelength conversion layer 30 disposed on the low refractive index layer 20, a passivation layer 40 disposed on the wavelength conversion layer 30, a first optical pattern layer 50 disposed below the light guide plate 10, and a second optical pattern layer 60 disposed on a lateral side of the light guide plate 10. The light guide plate 10, the low refractive index layer 20, the wavelength conversion layer 30, the passivation layer 40, and the first optical pattern layer 50 may be integrally combined to form a stack structure 11. The second optical pattern layer 60 may cover one side of the stack structure 11. In this case, the top surface of the stack structure 11 corresponds to a top surface 40a of the passivation layer 40, and the bottom surface of the stack structure 11 corresponds to a bottom surface 50b of the first optical pattern layer 50.

The light guide plate 10 guides the path of light. The light guide plate 10 may be substantially in the shape of a polygonal column. The planar shape of the light guide plate 10 may be rectangular, but the inventive concepts are not limited thereto. In one exemplary embodiment, the light guide plate 10 may be formed as a hexagonal column with a rectangular planar shape and may have a top surface 10a, a bottom surface 10b, and four sides, i.e., first, second, third, and fourth sides 10s1, 10s2, 10s3, and 10s4, respectively. The first, second, third, and fourth sides 10s1, 10s2, 10s3, and 10s4 will hereinafter be collectively referred to as the sides 10s, as necessary.

In one exemplary embodiment, each of the top surface 10a and the bottom surface 10b of the light guide plate 10 is disposed on a single plane, and the planes where the top surface 10a and the bottom surface 10b reside may be substantially parallel to each other so that the light guide plate 10 can generally have a uniform thickness. However, the inventive concepts are not limited to this exemplary embodiment. That is, alternatively, each of the top surface 10a and the bottom surface 10b may fall on multiple planes, and the planes where the top surface 10a and the bottom surface 10b reside may cross each other. For example, if the light guide plate 10 is formed as a wedge, the thickness of the light guide plate 10 may gradually decrease from one side (e.g., a light-incident surface) to the other side (e.g., a counter surface). In another example, the bottom surface 10b may be upwardly inclined from one side (e.g., the light-incident surface) toward the other side (e.g., the counter surface) so that the thickness of the light guide plate 10 gradually decreases, and may then extend in parallel to the top surface 10a so that the thickness of the light guide plate 10 becomes uniform.

A light source 400 may be disposed adjacent to at least one side of the light guide plate 10. A plurality of light-emitting diodes (LED) 410 may be disposed adjacent to the first side 10s1, which corresponds to one of the long sides of the light guide plate 10, but the inventive concepts are not limited thereto. For example, the LEDs 410 may be disposed adjacent to both the first and third sides 10s1 and 10s3, which correspond to the long sides of the light guide plate 10, or adjacent to both the second and fourth sides 10s2 and 10s4, which correspond to the short sides of the light guide plate 10. In the exemplary embodiment of FIG. 1, the first side 10s1 of the light guide plate 10 near which the light source 400 is disposed may become a light-incident surface, and the third side 10s3 opposite to the first side 10s1 may become a counter surface.

The LEDs 410 may emit blue light. That is, light emitted from the LEDs 410 may be light having a blue wavelength band. In one exemplary embodiment, the peak wavelength band of blue light emitted from the LEDs 410 may be 400 nm to 500 nm. The blue light emitted from the LEDs 410 may enter the light guide plate 10 through the light-incident surface 10s1.

The light guide plate 10 may comprise an inorganic material. For example, the light guide plate 10 may be formed of glass, but the inventive concepts are not limited thereto.

The low refractive index layer 20 is disposed on the top surface 10a of the light guide plate 10. The low refractive index layer 20 may be formed directly on the top surface 10a of the light guide plate 10 and may thus, be in contact with the top surface 10a of the light guide plate 10. The low refractive index layer 20 is interposed between the light guide plate 10 and the wavelength conversion layer 30 and assists in the total reflection of light inside the light guide plate 10.

Specifically, in order for the light guide plate 10 to efficiently guide light from the light-incident surface 10s1 to the counter surface 10s3, an effective total internal reflection may preferably be needed at the top surface 10a and the bottom surface 10b of the light guide plate 10. One of the conditions for causing total internal reflection in the light guide plate 10 is that the refractive index of the light guide plate 10 is greater than the refractive index of a medium that forms an optical interface with the light guide plate 10. The lower the refractive index of the medium that forms an optical interface with the light guide plate 10 is, the smaller the critical angle for total reflection becomes, and the more the total internal reflection will take place.

For example, in a case where the light guide plate 10 is formed of glass having a refractive index of about 1.5, a sufficient total reflection may be able to take place in the light guide plate 10 because the bottom surface 10b of the light guide plate 10 is exposed to, and thus, forms an optical interface with, an air layer having a refractive index of about 1.

On the other hand, since optical function layers are integrally stacked on the top surface 10a of the light guide plate 10, total reflection may not be able to sufficiently take place at the top surface 10a of the light guide plate 10. For example, if a material layer having a refractive index of 1.5 or higher is stacked on the top surface 10a of the light guide plate 10, total reflection may not be able to take place at the top surface 10a of the light guide plate 10. Also, if a material layer having a refractive index of, for example, 1.49, which is slightly less than the refractive index of the light guide plate 10, is stacked on the top surface 10a of the light guide plate 10, total internal reflection may be able to take place at the top surface 10a of the light guide plate 10, but not sufficiently, because the critical angle for total reflection is too large. The wavelength conversion layer 30, which is stacked on the top surface 10a of the light guide plate 10, may generally have a refractive index of about 1.5. Thus, if the wavelength conversion layer 30 is formed directly on the top surface 10a of the light guide plate 10, total reflection may not be able to sufficiently take place at the top surface 10a of the light guide plate 10.

The low refractive index layer 20, which is interposed between the light guide plate 10 and the wavelength conversion layer 30 and forms an interface with the top surface 10a of the light guide plate 10, has a lower refractive index than the light guide plate 10 and thus, allows total reflection to take place at the top surface 10a of the light guide plate 10. Also, the low refractive index layer 20 has a lower refractive index than the wavelength conversion layer 30, which is a material layer disposed on the low refractive index layer 20, and thus, allows more total reflection to take place than when the wavelength conversion layer 30 is disposed directly on the top surface 10a of the light guide plate 10.

The difference between the refractive index of the light guide plate 10 and the refractive index of the low refractive index layer 20 may be 0.2 or greater. In this case, total reflection can sufficiently take place via the top surface 10a of the light guide plate 10. The upper limit for the difference between the refractive index of the light guide plate 10 and the refractive index of the low refractive index layer 20 is not particularly limited, but may be 1 or less.

The low refractive index layer 20 may have a refractive index of 1.2 to 1.4. Generally, the manufacturing cost of a solid medium exponentially increases as the refractive index of the solid medium becomes closer to 1. If the refractive index of the low refractive index layer 20 is 1.2 or greater, an excessive increase in the manufacturing cost of the optical member 100 can be prevented. Also, the refractive index of the low refractive index layer 20 may preferably be 1.4 or lower to sufficiently reduce the critical angle for total reflection at the top surface 10a of the light guide plate 10. In one exemplary embodiment, the low refractive index layer 20 may have a refractive index of about 1.24.

To have such a low refractive index, the low refractive index layer 20 may include voids. The voids may be vacuum or may be filled with an air layer or a gas. The voids may be defined by particles and/or a matrix, and this will hereinafter be described with reference to FIGS. 3 and 4.

Figure 3:
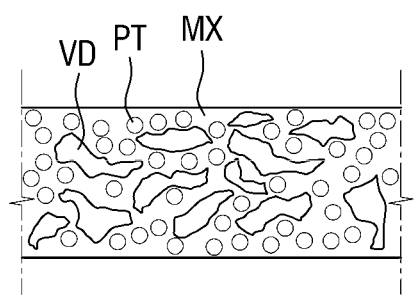
FIGS. 3 and 4 are cross-sectional views of exemplary low refractive index layers.
Figure 4:
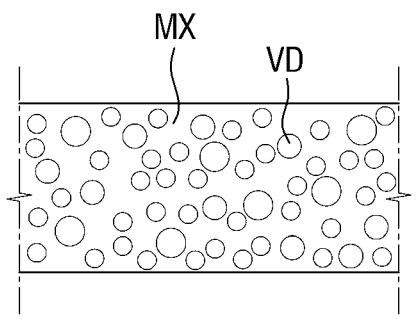

FIGS. 3 and 4 are cross-sectional views of exemplary low refractive index layers.

In one exemplary embodiment, as illustrated in FIG. 3, the low refractive index layer 20 may include a plurality of particles PT, a matrix MX surrounding the particles PT, and voids VD. The particles PT may be fillers for controlling the refractive index and the mechanical strength of the low refractive index layer 20.

The particles PT may be dispersed in the matrix MX, and the voids VD may be formed in gaps in the matrix MX. For example, the voids VD may be formed in the matrix MX by mixing the particles PT and the matrix MX in a solvent and drying and/or curing the mixture so as to evaporate the solvent.

In another exemplary embodiment, as illustrated in FIG. 4, the low refractive index layer 20 may include a matrix MX and voids VD without having particles. For example, the low refractive index layer 20 may include a matrix MX, such as a foam resin and a plurality of voids VD disposed in the matrix MX.

In a case where the low refractive index layer 20 includes the voids VD, as illustrated in FIGS. 3 and 4, the total refractive index of the low refractive index layer 20 may be in a range between the refractive index of the particles PT or the matrix MX and the refractive index of the voids VD. As already mentioned above, if the voids VD are vacuum with a refractive index of 1 or are filled with an air layer or a gas with a refractive index of about 1, the total refractive index of the low refractive index layer 20 may become 1.4 or lower, for example, about 1.25, even if the particles PT or the matrix MX are formed of a material with a refractive index of 1.4 or higher. In one exemplary embodiment, the particles PT may be formed of an inorganic material such as $SiO_2$, $Fe_2O_3$, or $MgF_2$, and the matrix MX may be formed of an organic material, such as polysiloxane. However, the materials of the particles PT and the matrix MX are not particularly limited.

Referring again to FIGS. 1 and 2, the thickness of the low refractive index layer 20 may be 0.4 μm to 2 μm. If the thickness of the low refractive index layer 20 is 0.4 μm or greater, which corresponds to the wavelength band of visible light, the low refractive index layer 20 may form a valid optical interface with the top surface 10a of the light guide plate 10, and as a result, total reflection may be able to properly take place at the top surface 10a of the light guide plate 10 according to Snell's law. If the low refractive index layer 20 is too thick, the optical member 100 may also become excessively thick, the manufacturing cost of the optical member 100 may increase, and the luminance of the optical member 100 may deteriorate. Thus, the low refractive index layer 20 may have a thickness of 2 μm or less.

In one exemplary embodiment, the low refractive index layer 20 may cover most of the top surface 10a of the light guide plate 10, but may partially expose the edges of the light guide plate 10. In other words, the sides 10s of the light guide plate 10 may protrude beyond the sides of the low refractive index layer 20. Part of the top surface 10a exposed by the low refractive index layer 20 may provide a space in which the sides of the low refractive index layer 20 can be stably covered by the passivation layer 40.

In another exemplary embodiment, the low refractive index layer 20 may cover the entire top surface 10a of the light guide plate 10. The sides of the low refractive index layer 20 may be aligned with the sides 10s of the light guide plate 10. The difference between these exemplary embodiments may result from the manufacturing process of the light guide plate 10. This will be described later with reference to FIGS. 12 through 16.

The low refractive index layer 20 may be formed by coating. For example, the low refractive index layer 20 may be formed by coating a composition for forming the low refractive index layer 20 on the top surface 10a of the light guide plate 10 and drying and curing the composition. The composition may be coated on the top surface 10a of the light guide plate 10 by slit coating, spin coating, roll coating, spray coating, or inkjet coating, but the present disclosure is not limited thereto. That is, the composition may be coated on the top surface 10a of the light guide plate 10 using various methods other than those set forth herein.

Although not specifically illustrated, a barrier layer may be further disposed between the low refractive index layer 20 and the light guide plate 10. The barrier layer may cover the entire top surface 10a of the light guide plate 10. The sides of the barrier layer may be aligned with the sides 10s of the light guide plate 10. The low refractive index layer 20 may be formed to be in contact with the top surface of the barrier layer. The low refractive index layer 20 may partially expose the edges of the barrier layer.

The barrier layer, like the passivation layer 40, prevents the penetration of moisture and/or oxygen. The barrier layer may comprise an inorganic material. For example, the barrier layer may comprise silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metal film with light transmittance. The barrier layer may be formed of the same material as the passivation layer 40, but the present disclosure is not limited thereto. The barrier layer may be formed by deposition such as chemical vapor deposition (CVD).

The wavelength conversion layer 30 is disposed on a top surface 20a of the low refractive index layer 20. The wavelength conversion layer 30 converts the wavelength of at least some light incident thereupon. The wavelength conversion layer 30 may include a binder layer and wavelength conversion particles dispersed in the binder layer. The wavelength conversion layer 30 may further include scattering particles dispersed in the binder layer.

The binder layer, which is a medium in which the wavelength conversion particles are dispersed, may be formed of various resin compositions that can generally be referred to as binders, but the inventive concepts are not limited thereto. Nearly any type of medium that can disperse the wavelength conversion particles and/or the scattering particles therein can be referred to as a binder layer regardless of its actual name, additional function(s), and composition.

The wavelength conversion particles, which are particles for converting the wavelength of incident light, may be, for example, quantum dots (QDs), a fluorescent material, or a phosphor material. The QDs are a material having a nanometer-sized crystal structure and consist of several hundreds to thousands of atoms. Due to the small size of the QDs, an energy band gap increases, i.e., a quantum confinement effect occurs. In response to light with higher energy than the energy band gap being incident upon QDs, the QDs absorb the incident light to be excited, emit light of a particular wavelength, and then fall to the ground state. The light emitted by the QDs has a value corresponding to the energy band gap. The emission characteristics of the QDs, resulting from quantum confinement, can be controlled by adjusting the size and the composition of the QDs.

The QDs may comprise at least one of, for example, a Group II-VI compound, a Group II-V compound, a Group III-VI compound, a Group III-V compound, a Group IV-VI compound, a Group compound, a Group II-IV-VI compound, and a Group II-IV-V compound.

Each of the QDs may include a core and a shell overcoating the core. The core may include at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. The shell may include at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TiN, TiP, TiAs, TiSb, PbS, Pb Se, and PbTe.

The wavelength conversion particles may include a plurality of groups of wavelength conversion particles converting incident light into different wavelengths. For example, the wavelength conversion particles may include first wavelength conversion particles converting incident light of a particular wavelength into a first wavelength and second wavelength conversion particles converting the incident light of the particular wavelength into a second wavelength. In one exemplary embodiment, light emitted from the light source 400 to be incident upon the wavelength conversion particles may be blue-wavelength light, the first wavelength may be a green wavelength, and the second wavelength may be a red wavelength. For example, the blue wavelength may have a peak in the range of 420 nm to 470 nm, the green wavelength may have a peak in the range of 520 nm to 570 nm, and the red wavelength may have a peak in the range of 620 nm to 670 nm. However, the disclosed blue, green, and red wavelengths are not particularly limited and should be understood as encompassing all wavelength bands that are typically perceived as blue, green, and red wavelengths.

In this exemplary embodiment, some blue light incident upon the wavelength conversion layer 30 may encounter the first wavelength conversion particles to be converted into, and emitted as, green light through the wavelength conversion layer 30, some blue light incident upon the wavelength conversion layer 30 may encounter the second wavelength conversion particles to be converted into, and emitted as, red light through the wavelength conversion layer 30, and some blue light incident upon the wavelength conversion layer 30 may be emitted as is without encountering the first wavelength conversion particles or the second wavelength conversion particles. Thus, light transmitted through the wavelength conversion layer 30 may include all blue-wavelength light, green-wavelength light, and red-wavelength light. By appropriately controlling the ratio of emitted light of different wavelengths, white light or light of various colors can be displayed. Beams of light converted by the wavelength conversion layer 30 are concentrated on narrow wavelength bands and thus, have a sharp spectrum with a narrow half-width. Accordingly, color reproducibility can be improved by filtering light having such spectrum through color filters to realize colors.

In another exemplary embodiment, incident light may be short-wavelength light such as ultraviolet (UV) light, and three groups of wavelength conversion particles converting the short-wavelength light into blue-, green-, and red-wavelength light may be provided in the wavelength conversion layer 30 to emit white light.

The wavelength conversion layer 30 may further include the scattering particles. The scattering particles, which are non-QDs, may be particles with no wavelength conversion function. The scattering particles scatter incident light and thus, allow more of the incident light to be incident upon the wavelength conversion particles. The scattering particles can uniformly control the emission angle of light of each wavelength. Specifically, when light is incident upon the wavelength conversion particles and is then wavelength-converted and emitted, the emitted light has a random scattering characteristic. If the scattering particles are not provided in the wavelength conversion layer 30, green-wavelength light and red-wavelength light emitted after colliding with the wavelength conversion particles have a scattering emission characteristic, but blue-wavelength light emitted without colliding with the wavelength conversion particles does not have a scattering emission characteristic. Thus, the emission of blue-wavelength light, green-wavelength light, and red-wavelength light may vary depending on the emission angle of the light. Since the scattering particles impart a scattering emission characteristic even to blue-wavelength light emitted without colliding with the wavelength conversion particles, the emission angle of light of each wavelength can be uniformly controlled. $TiO_2$ or $SiO_2$ may be used as the scattering particles.

The wavelength conversion layer 30 may be thicker than the low refractive index layer 20. The wavelength conversion layer 30 may have a thickness of about 10 μm to 50 μm. In one exemplary embodiment, the wavelength conversion layer 30 may have a thickness of about 15 μm.

The wavelength conversion layer 30 may cover the top surface 20a of the low refractive index layer 20 and may completely overlap with the low refractive index layer 20. A bottom surface 30b of the wavelength conversion layer 30 may be in direct contact with the top surface 20a of the low refractive index layer 20. In one exemplary embodiment, the sides of the wavelength conversion layer 30 may be aligned with the sides of the low refractive index layer 20. FIG. 2 illustrates an example in which the sides of the wavelength conversion layer 30 and the sides of the low refractive index layer 20 are vertically aligned with the top surface 10a of the light guide plate 10, but the present disclosure is not limited thereto. That is, alternatively, the sides of the wavelength conversion layer 30 and the sides of the low refractive index layer 20 have an inclination angle of less than 90° with respect to the top surface 10a of the light guide plate 10. The inclination angle of the sides of the wavelength conversion layer 30 may be less than the inclination angle of the sides of the low refractive index layer 20. As will be described later, if the wavelength conversion layer 30 is formed by slit coating, the sides of the wavelength conversion layer 30, which is relatively thick, may have a gentler inclination angle than the sides of the low refractive index layer 20, but the present disclosure is not limited thereto. That is, alternatively, the inclination angle of the sides of the wavelength conversion layer 30 may be substantially the same as, or even less than, the inclination angle of the sides of the low refractive index layer 20.

The wavelength conversion layer 30 may be formed by coating. For example, the wavelength conversion layer 30 may be formed by slit-coating a wavelength conversion composition on the light guide plate 10 with the low refractive index layer 20 formed thereon and drying and curing the wavelength conversion composition, but the present disclosure is not limited thereto. That is, the wavelength conversion layer 30 may be formed using various methods other than that set forth herein.

The passivation layer 40 is disposed above the low refractive index layer 20 and the wavelength conversion layer 30. The passivation layer 40 prevents the penetration of moisture and/or oxygen. The passivation layer 40 may comprise an inorganic material. For example, the passivation layer 40 may comprise silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metal film with light transmittance. In one exemplary embodiment, the passivation layer 40 may be formed of silicon nitride.

The passivation layer 40 may completely cover the low refractive index layer 20 and the wavelength conversion layer 30 on at least one side thereof. In one exemplary embodiment, the passivation layer 40 may completely cover the low refractive index layer 20 and the wavelength conversion layer 30 on all the sides thereof, but the inventive concepts are not limited thereto.

The passivation layer 40 completely overlaps with the wavelength conversion layer 30, covers the top surface 30a of the wavelength conversion layer 30, and extends further from the top surface 30a of the wavelength conversion layer 30 to cover the sides of the wavelength conversion layer 30 and the sides of the low refractive index layer 20. The passivation layer 40 may be in contact with the top surface 30a and the sides of the wavelength conversion layer 30 and the sides of the low refractive index layer 20. The passivation layer 40 may extend to the edges of the top surface 10a of the light guide plate 10, exposed by the low refractive index layer 20, and may thus, be in direct contact with the top surface 10a of the light guide plate 10. In one exemplary embodiment, the sides of the passivation layer 40 may be aligned with the sides 10s of the light guide plate 10.

The thickness of the passivation layer 40 may be less than the thickness of the wavelength conversion layer 30 and may be the same as, or less than, the thickness of the low refractive index layer 20. The thickness of the passivation layer 40 may be 0.1 µm to 2 µm. If the thickness of the passivation layer 40 is 0.1 µm or greater, the passivation layer 40 may be able to perform a moisture/oxygen penetration prevention function at a significant level. If the thickness of the passivation layer 40 is 0.3 µm or greater, the passivation layer 40 may be able to perform the moisture/oxygen penetration prevention function even more effectively. The thickness of the passivation layer 40 may preferably be 2 µm or less in terms of achieving thinness and transmittance. In one exemplary embodiment, the thickness of the passivation layer 40 may be about 0.4 µm.

The wavelength conversion layer 30, particularly, the wavelength conversion particles included in the wavelength conversion layer 30, are highly susceptible to moisture and/or oxygen. In a typical wavelength conversion film, barrier films are laminated on the top and bottom surfaces of a wavelength conversion layer to prevent the penetration of moisture and/or oxygen into the wavelength conversion layer. On the other hand, in the optical member 100, the wavelength conversion layer 30 is provided without any barrier films laminated thereon, and thus, a sealing structure for protecting the wavelength conversion layer 30 is needed to replace barrier films. The sealing structure may be embodied by the passivation layer 40 and the light guide plate 10.

Moisture may penetrate the wavelength conversion layer 30 through the top surface 30a, the sides, and the bottom surface 30b of the wavelength conversion layer 30. As already mentioned above, the top surface 30a and the sides of the wavelength conversion layer 30 are covered and protected by the passivation layer 40. Thus, the penetration of moisture and/or oxygen through the top surface 30a and the sides of the wavelength conversion layer 30 can be prevented, or at least alleviated.

On the other hand, the bottom surface 30b of the wavelength conversion layer 30 is in contact with the top surface 20a of the low refractive index layer 20. In a case where the low refractive index layer 20 includes voids or is formed of an organic material, moisture may move around within the low refractive index layer 20, and thus, moisture and/or oxygen may penetrate the wavelength conversion layer 30 through the bottom surface 30b of the wavelength conversion layer 30. However, since the low refractive index layer 20 has a sealing structure, the penetration of moisture and/or oxygen through the bottom surface 30b of the wavelength conversion layer 30 can be prevented.

Specifically, since the sides of the low refractive index layer 20 are covered and protected by the passivation layer 40, the penetration of moisture and/or oxygen through the sides of the low refractive index layer 20 can be prevented, or at least alleviated. Even if the low refractive index layer 20 protrudes beyond the wavelength conversion layer 30 so that part of the top surface 20a of the low refractive index layer 20 is exposed, the exposed part of the top surface 20a is still covered and protected by the passivation layer 40, and thus, the penetration of moisture and/or oxygen through the top surface 20a of the low refractive index layer 20 can be prevented, or at least alleviated. The bottom surface 20b of the low refractive index layer 20 is in contact with the light guide plate 10. In a case where the light guide plate 10 is formed of an inorganic material such as glass, the light guide plate 10, like the passivation layer 40, can prevent or alleviate the penetration of moisture and/or oxygen. Since the stack of the low refractive index layer 20 and the wavelength conversion layer 30 is surrounded and sealed by the passivation layer 40 and the light guide plate 10, the penetration of moisture and/or oxygen can be prevented, or at least alleviated, by the sealing structure formed by the passivation layer 40 and the light guide plate 10, even if there are passages for moisture and/or oxygen in the low refractive index layer 20. Therefore, the degradation of the wavelength conversion particles by moisture and/or oxygen can be prevented, or at least alleviated.

The passivation layer 40 may be formed by deposition. For example, the passivation layer 40 may be formed, through CVD, on the light guide plate 10 with the low refractive index layer 20 and the wavelength conversion layer 30 sequentially formed thereon, but the inventive concepts are not limited thereto. That is, the passivation layer 40 may be formed using various deposition methods other than CVD.

As already mentioned above, since the optical member 100 is an integral single member capable of performing both an optical guide function and a wavelength conversion function at the same time, the manufacture of a display device can be simplified. Also, since in the optical member 100, the low refractive index layer 20 is disposed on the top surface 10a of the light guide plate 10, total reflection can effectively take place at the top surface 10a of the light guide plate 10. Also, since the low refractive index layer 20 and the wavelength conversion layer 30 are sealed by the passivation layer 40, the degradation of the wavelength conversion layer 30 can be prevented.

The first optical pattern layer 50 may be disposed below the light guide plate 10. A top surface 50a of the first optical pattern layer 50 may be in contact with the bottom surface 10b of the light guide plate 10, but the present disclosure is not limited thereto. That is, alternatively, an additional layer may be formed between the first optical pattern layer 50 and the light guide plate 10, or the first optical pattern layer 50 and the light guide plate 10 may be spaced apart from each other to have an empty space therebetween.

In one exemplary embodiment, the sides of the first optical pattern layer 50 may be aligned with the sides 10s of the light guide plate 10. That is, the first optical pattern layer 50 may completely cover the bottom surface 10b of the light guide plate 10. In another exemplary embodiment, the first optical pattern layer 50 may cover most of the bottom surface 10b of the light guide plate 10, but may partially expose the edges of the light guide plate 10. That is, the sides 10s of the light guide plate 10 may protrude beyond the sides of the first optical pattern layer 50.

The first optical pattern layer 50 changes the path of light traveling within the light guide plate 10 through total reflection and thus allows the light to be emitted. Specifically, light traveling toward the first optical pattern layer 50, among beams of light incident upon the light-incident surface 10s1, is refracted or reflected at the interface between the first optical pattern layer 50 and an air layer to travel toward the counter surface 10s3.

In one exemplary embodiment, the first optical pattern layer 50 may be provided as a separate layer from the light guide plate 10. The first optical pattern layer 50 may be a scattering pattern layer providing scattering patterns, including protrusion patterns and/or recess patterns, on the bottom surface 10b of the light guide plate 10. In another exemplary embodiment, the first optical pattern layer 50 may not be provided as a separate layer, but may be formed on the light guide plate 10 as surface patterns.

The scattering patterns of the first optical pattern layer 50 may be formed as linear patterns extending in parallel to the light-incident surface 10s1 and the counter surface 10s3. The scattering patterns of the first optical pattern layer 50 may have various cross-sectional shapes, such as a semicircular, triangular, or rectangular cross-sectional shape. The cross-sectional shape of the scattering patterns of the first optical pattern layer 50 may be uniform, but the inventive concepts are not limited thereto. The scattering patterns of the first optical pattern layer 50 may be formed in a lenticular shape and may have a semicircular cross-sectional shape, and the size of the scattering patterns of the first optical pattern layer 50 may be uniform from the light-incident surface 10s1 to the counter surface 10s3. However, the cross-sectional shape of the scattering patterns of the first optical pattern layer 50 is not particularly limited, and the size of the scattering patterns of the first optical pattern layer 50 may gradually increase from the light-incident surface 10s1 to the counter surface 10s3.

The scattering patterns of the first optical pattern layer 50 may be formed on a base film using an imprinting method or a mold, but the inventive concepts are not limited thereto. That is, the scattering patterns of the first optical pattern layer 50 may be formed using various methods other than those set forth herein.

Although not specifically illustrated, the first optical pattern layer 50 may further include an adhesive member (not illustrated). The adhesive member may be disposed between the top surface 50a of the first optical pattern layer 50 and the bottom surface 10b of the light guide plate 10 and may attach and fix the first optical pattern layer 50 on the bottom surface 10b of the light guide plate 10. The adhesive member may comprise a pressure sensitive adhesive (PSA) and may further comprise a primer for improving adhesiveness, but the inventive concepts are not limited thereto.

The second optical pattern layer 60 is disposed on the light-incident surface 10s1 of the light guide plate 10. The second optical pattern layer 60 is disposed between the light source 400 and the light guide plate 10 and controls the angle of incidence of light upon the light guide plate 10. The second optical pattern layer 60 may include a Fresnel lens structure. The structure and functions of the second optical pattern layer 60 will hereinafter be described with reference to FIGS. 5 through 7.

Figure 5:
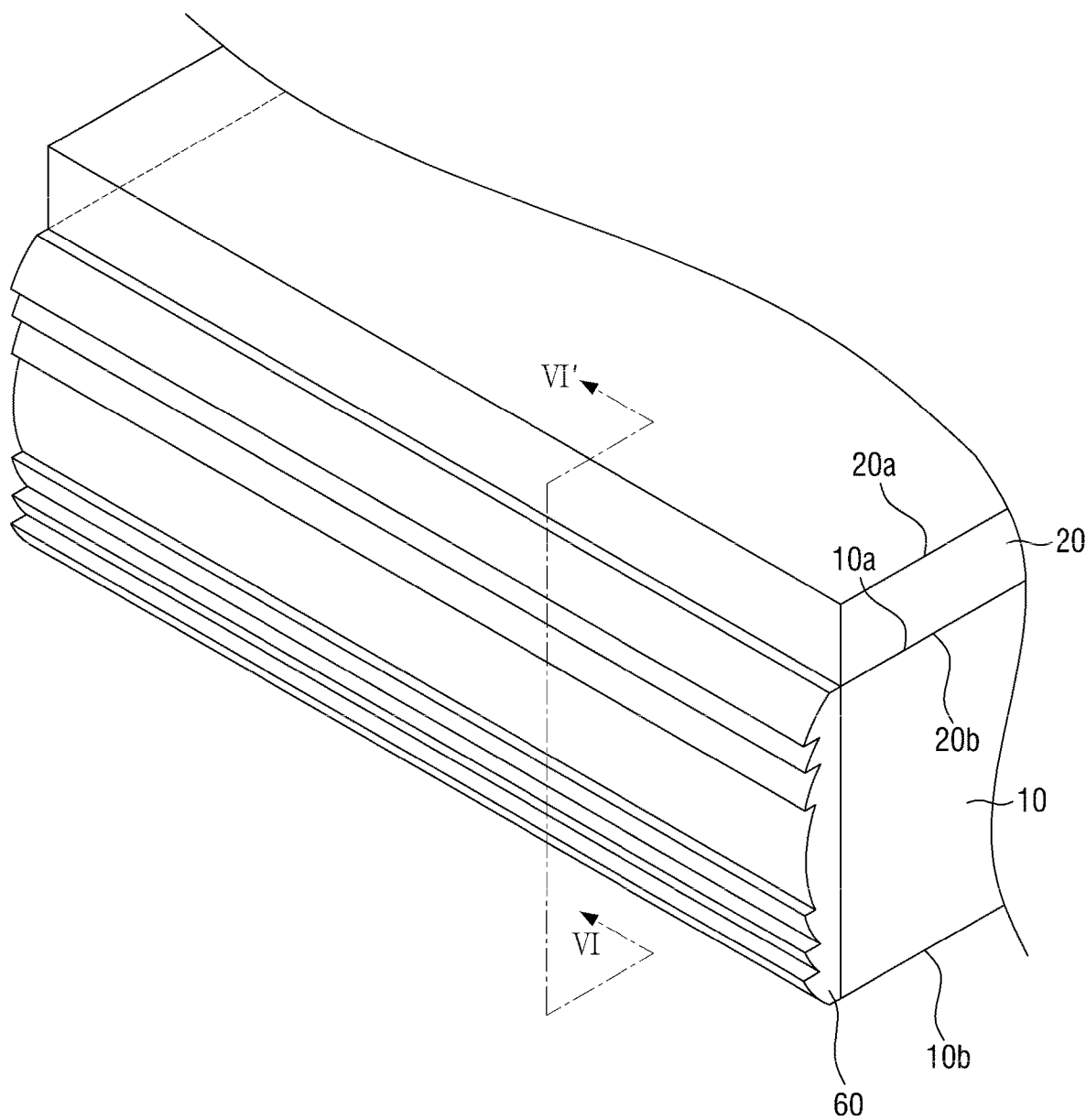
FIG. 5 is an enlarged perspective view of the optical member of FIG. 1.
Figure 6:
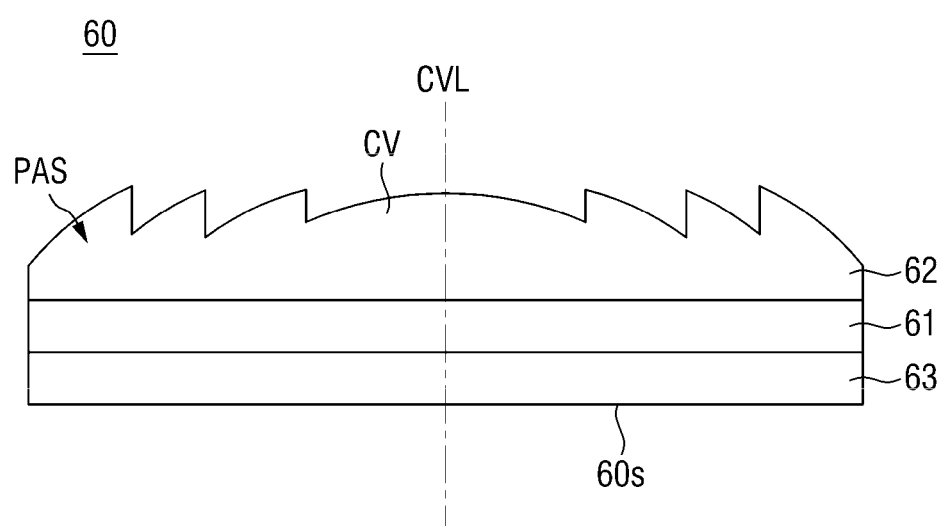
FIG. 6 is a cross-sectional view, taken along line VI-VI' of FIG. 5, of an exemplary second optical pattern layer.
Figure 7:
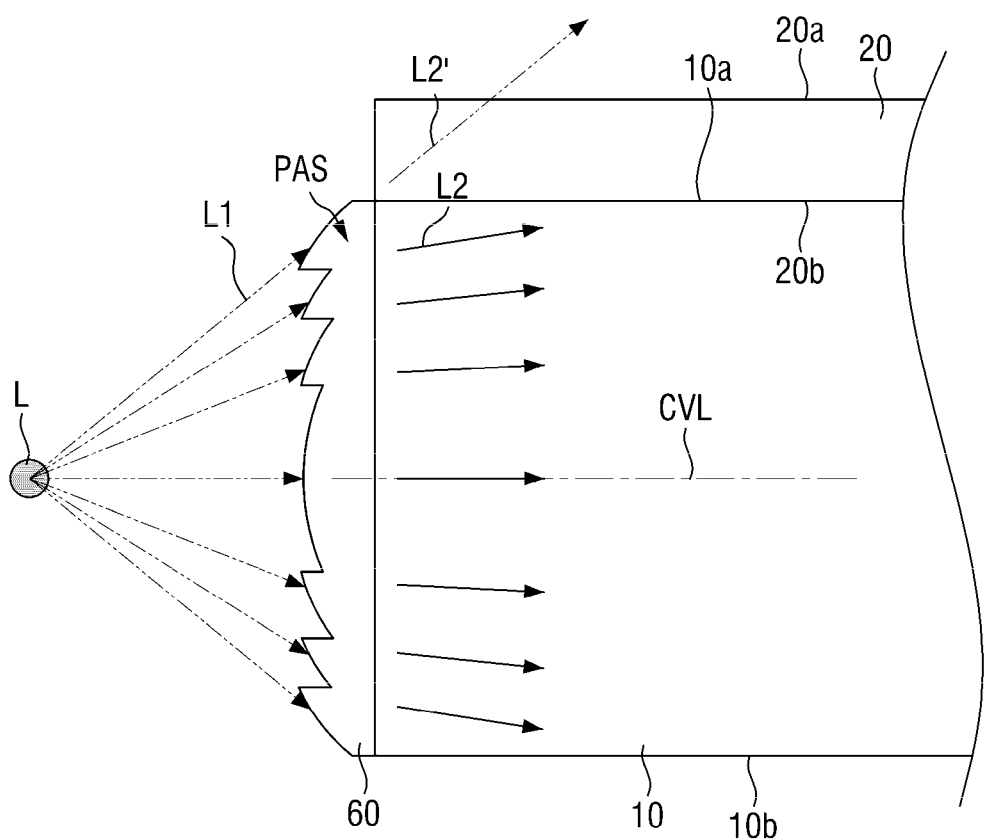
FIG. 7 is a cross-sectional view illustrating the path of light passing through the second optical pattern layer of FIG. 6.

FIG. 5 is an enlarged perspective view of the optical member according to another exemplary embodiment of the present invention. FIG. 6 is a cross-sectional view, taken along line VI-VI' of FIG. 5, of an exemplary second optical pattern layer. FIG. 7 is a cross-sectional view illustrating the path of light passing through the second optical pattern layer of FIG. 6.

Referring to FIGS. 1, 2, 5, and 6, the second optical pattern layer 60 may include a base layer 61, a pattern layer 62, and an adhesive layer 63. The base layer 61 may be a supporting member supporting each layer of the second optical pattern layer 60. The size of the base layer 61 may be substantially the same as the size of the pattern layer 62, but the inventive concepts are not limited thereto. That is, alternatively, the base layer 61 may be larger than the pattern layer 62. In this case, the edges of the base layer 61 may be exposed. This will be described later with reference to FIG. 21.

The base layer 61 may be a thin film whose top and bottom surfaces are parallel with each other. The base layer 61 may comprise an inorganic material and may thus, perform a moisture/oxygen penetration prevention function. The base layer 61 may be formed as an acrylic film, a polyether film, a polyester film, a polyolefin film, a polyamide film, a polyurethane film, a polycarbonate film, or polyimide film, but the inventive concepts are not limited thereto.

The pattern layer 62 may be disposed on the base layer 61. The pattern layer 62 may be formed to cover the entire base layer 61, but the inventive concepts are not limited thereto. That is, as already mentioned above, the pattern layer 62 may be formed to expose the edges of the base layer 61.

The pattern layer 62 may include a focusing lens structure. For example, the pattern layer 62 may have surface irregularities. The surface irregularities of the pattern layer 62 may form the structure of a linear Fresnel lens, which is a type of focusing lens. That is, the pattern layer 62 may have a shape in which thin prism bands having the same curvature as a convex lens are arranged at a constant pitch. The pattern layer 62 including a Fresnel lens structure, like a convex lens, can focus light while maintaining a small thickness. In some exemplary embodiments, the surface irregularities of the pattern layer 62 may be divided into several bands each serving as a prism. Accordingly, the pattern layer 62 can have a small thickness and a small aberration.

Specifically, the pattern layer 62 may include a plurality of uneven patterns PAS and a convex surface CV. The uneven patterns PAS and the convex surface CV of the pattern layer 62 may be formed on a surface opposite to the surface of the pattern layer 62 that is adhered to the base layer 61. That is, the surface on which the uneven patterns PAS and the convex surface CV are formed may be a surface exposed to the outside.

The convex surface CV may be disposed to overlap with a center CVL of the pattern layer 62. Due to the convex surface CV, which is a surface with a predetermined curvature, the pattern layer 62 may be thicker at the center CVL than on both sides of the convex surface CV. The uneven patterns PAS may be disposed on the outside of the convex surface CV. A plurality of uneven patterns PAS may be arranged in series between the edges of the convex surface CV and both ends of the pattern layer 62. The uneven patterns PAS may include planar surfaces parallel to the top surface 10a and the bottom surface 10b of the light guide plate 10 and curved surfaces with a predetermined curvature. The convex surface CV and the uneven patterns PAS of the pattern layer 62 may include surfaces extending in parallel to the top surface 10a and the bottom surface 10b of the light guide plate 10.

The pattern layer 62 may be formed of acrylate, urethane, urethane acrylate, silicone, epoxy, or a combination thereof and may include a UV initiator and a binder, but the inventive concepts are not limited thereto.

The path of light passing through the second optical pattern layer 60 including a Fresnel lens will hereinafter be described with reference to FIG. 7.

FIG. 7 illustrates light emitted from a light source L passes through the second optical pattern layer 60. Referring to FIG. 7, a Lambertian emitter, such as the LEDs 410 of FIG. 1, is applied as the light source L. Light emitted from the light source L may be incident upon the second optical pattern layer 60 and may be refracted according to the difference in refractive index at the interface formed by the second optical pattern layer 60.

The second optical pattern layer 60 may include a plurality of uneven patterns PAS. Light emitted from the light source L may pass through the second optical pattern layer 60 and may enter the light guide plate 10. Some of the light emitted from the light source L may pass through uneven patterns PAS on one end portion of the second optical pattern layer 60.

The path of light passing through the second optical pattern layer 60 will hereinafter be described, taking incident light L1, which is light incident upon one end portion of the second optical pattern layer 60, and refracted light L2, which is the incident light L1 refracted passing through the second optical pattern layer 60.

In order for total reflection of light to effectively take place within the light guide plate 10, the light needs to be incident upon the interface between the light guide plate 10 and the second optical pattern layer 60 at an incidence angle greater than a predetermined critical angle. The critical angle may be determined by the difference in refractive index between the light guide plate 10 and a layer that forms an interface with the light guide plate 10, and the greater the difference in refractive index between the light guide plate 10 and the layer that forms an interface with the light guide plate 10 is, the smaller the critical angle becomes, and the more effectively total reflection will take place. As already mentioned above, if the wavelength conversion layer 30 (of FIG. 2) is disposed directly on the light guide plate 10, total reflection may not be able to properly take place because the difference between the refractive index of the light guide plate 10 and the refractive index of the wavelength conversion layer is small. Thus, the low refractive index layer 20 may be provided between the light guide plate 10 and the wavelength conversion layer 30, thereby reducing the critical angle so as for total reflection to effectively take place. The critical angle may be determined by the difference between the refractive index of the light guide plate 10 and the refractive index of the low refractive index layer 20. For example, when the refractive index of the light guide plate 10 is 1.515 and the refractive index of the low refractive index layer 20 is 1.24, the critical angle may be about 55.5°.

The incident light L1 travels without passing through the second optical pattern layer 60 to follow the path of non-refracted light L2'. If the non-refracted light L2' is incident upon the light guide plate 10 at an incidence angle less than the critical angle, some of the non-refracted light L2' may penetrate the light guide plate 10 without being subject to total reflection at the interface between the top surface 10a of the light guide plate 10 and the bottom surface 20b of the low refractive index layer 20. That is, some of the non-refracted light L2' may not be guided by the light guide plate 10 and may thus cause light leakage, particularly, at the light-incident surface S1. Such light leakage may reduce the luminance of a display device. For example, luminance loss caused by such light leakage may amount to 10% to 15% of the original luminance of a display device depending on the refractive index of the low refractive index layer 20.

In a case where the second optical pattern layer 60 is disposed on the light-incident surface 10s1 of the light guide plate 10, the incident light L1 may be refracted by the second optical pattern layer 60, and the refracted light L2 may be incident upon the top surface 10a of the light guide plate 10 and the bottom surface 20b of the low refractive index layer 20. The incidence angle of the refracted light L2 may be greater than the incidence angle of the non-refracted light L2'. That is, the second optical pattern layer 60 can convert an angular component of the incident light L1 into an angular component of the refracted light L2 that is greater than the critical angle, and as a result, total reflection can effective take place. Light passing through both end portions of the second optical pattern layer 60 can be refracted more than light passing through the center CVL of the second optical pattern layer 60. Light causing light leakage may be light incident upon both end portions of the second optical pattern layer 60. Thus, the incident light L1, which is incident upon an end portion of the second optical pattern layer 60, may be effectively subject to total reflection.

Referring again to FIGS. 5 and 6, the adhesive layer 63 may be disposed below the base layer 61. In a case where the adhesive layer 63 is attached on the light-incident surface 10s1 of the light guide plate 10, light loss that may be caused by Fresnel reflection at the interface between the second optical pattern layer 60 and the light guide plate 10 can be prevented.

The adhesive layer 63 is disposed between an attachment surface 60s of the second optical pattern layer 60 and the light-incident surface 10s1 of the light guide plate 10 and attaches and fixes the second optical pattern layer 60 on the light-incident surface 10s1 of the light guide plate 10. The adhesive layer 63, similar to the adhesive member of the first optical pattern layer 50, may include a PSA and may further include a primer for improving adhesiveness, but the inventive concepts are not limited thereto.

A release film (not illustrated) may be further disposed on the adhesive layer 63 before the second optical pattern layer 60 is attached to the light guide plate 10. The release film may protect the adhesive layer 63 and may be peeled off before the second optical pattern layer 60 is attached to the light-incident surface 10s1 of the light guide plate 10. The release film may be formed of, for example, polyethylene terephthalate (PET), but the inventive concepts are not limited thereto.

The second optical pattern layer 60 may be fabricated as a roll so as to be easily attachable to the light guide plate 10. A continuous bonding process can be performed by attaching the second optical pattern layer 60, which is in a wound state, to the light-incident surface 10s1 of the light guide plate 10 and cutting the second optical pattern layer 60.

Figure 8:
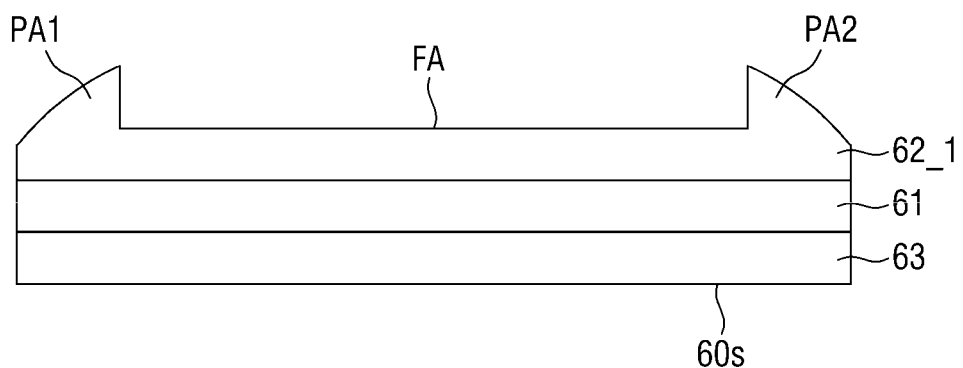
FIG. 8 is a cross-sectional view of another exemplary second optical pattern layer.

FIG. 8 is a cross-sectional view of another exemplary second optical pattern layer. A second optical pattern layer 60_1 of FIG. 8 differs from the second optical pattern layer 62 of FIG. 6 in that uneven patterns PA1 and PA2 are formed only at both ends of a pattern layer 62_1. The second optical pattern layer 62_1 will hereinafter be described, focusing mainly on the difference with the second optical pattern layer 62 of FIG. 6.

Referring to FIG. 8, the pattern layer 62_1 of the second optical pattern layer 60_1 may include the uneven patterns PA1 and PA2 and a flat surface FA. The uneven patterns PA1 and PA2 may be disposed at both ends of the pattern layer 62_1. For convenience, only two uneven patterns PA1 and PA2 are illustrated as being disposed at both ends of the pattern layer 62_1 with the flat surface FA disposed therebetween, but the inventive concepts are not limited thereto. That is, each of the uneven patterns PA1 and PA2 may include a plurality of optical patterns.

As already mentioned above, light incident upon both end portions of the second optical pattern layer 60_1 may cause light leakage. Thus, the uneven patterns PA1 and PA2 are formed only on both end portions of the second optical pattern layer 60_1 to control light incident upon both end portions of the second optical pattern layer 60_1. Light passing through the flat surface FA may travel along the same path as light passing through an optical member not including the second optical pattern layer 60_1. The flat surface FA may have a greater area than the uneven patterns PA1 and PA2.

Figure 9:
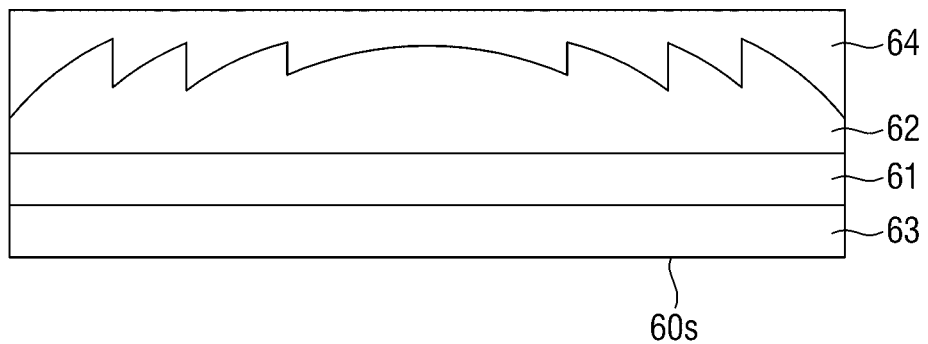
FIG. 9 is a cross-sectional view of another exemplary second optical pattern layer.

FIG. 9 is a cross-sectional view of another exemplary second optical pattern layer. A second optical pattern layer 60_2 of FIG. 9 differs from the second optical pattern layer 62 of FIG. 6 in that a passivation layer 64 is further provided on a pattern layer 62 to protect the second optical pattern layer 60_2.

Referring to FIG. 9, the passivation layer 64 may be disposed on the pattern layer 62. The passivation layer 64 may protect the pattern layer 52 such that the pattern layer 62 can maintain its shape. The top surface of the passivation layer 64 may be substantially parallel to the top surface of a base layer 61, but the present disclosure is not limited thereto. That is, alternatively, the passivation layer 64 may be formed to conform to the surface shape of the pattern layer 62.

In another exemplary embodiment, an additional adhesive member (not illustrated) may be further disposed on the passivation layer 64. The light source 400 of FIG. 1 may be attached to the adhesive member. The light source 400 may be disposed in a housing (500 of FIG. 22), and the second optical pattern layer 60_2 may be in contact with the light source 400 via the adhesive member. In a case where the second optical pattern layer 60_2 and the light source 400 are in contact with each other, light loss that may be caused by Fresnel reflection between the second optical pattern layer 60_2 and the light source 400 can be prevented.

Figure 10:
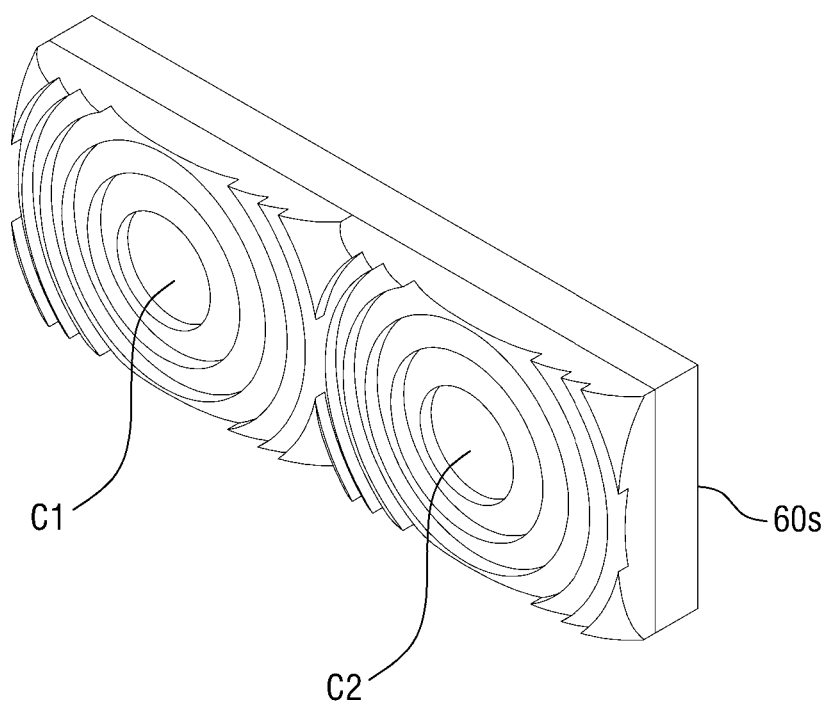
FIG. 10 and FIG. 11 are perspective views of other exemplary second optical pattern layers.
Figure 11:
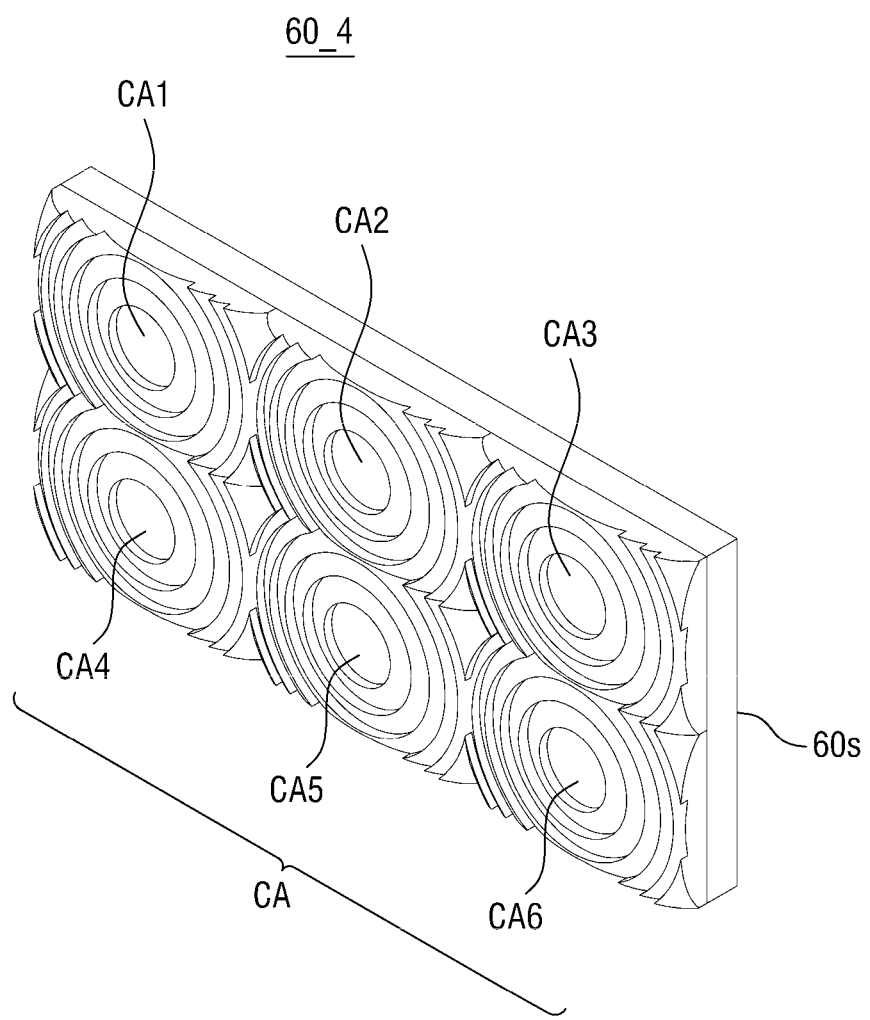

FIGS. 10 and 11 are perspective views of other exemplary second optical pattern layers. Second optical pattern layers 60_3 and 60_4 of FIGS. 10 and 11 differ from the second optical pattern layer 60 of FIG. 6 in that they include circular Fresnel lenses, instead of linear Fresnel lenses.

Referring to FIG. 10, the second optical pattern layer 60_3 may include circular Fresnel lenses C1 and C2, which are arranged in a row. The circular Fresnel lenses C1 and C2 may be disposed to face the light source 400 of FIG. 1 and the LEDs 410 of FIG. 1. Accordingly, not only the incidence angle of light that leaks from the top and the bottom of the light guide plate 10 of FIG. 2, but also the incidence angle of light that leaks from the left and right sides of the light guide plate 10 of FIG. 2, can be controlled. Therefore, the luminance uniformity of the light guide plate 10 can be improved.

Referring to FIG. 11, the second optical pattern layer 60_4 may include a circular Fresnel lens array CA having a plurality of circular Fresnel lenses CA1, CA2, CA3, CA4, CA5, and CA6 arranged in multiple rows. For convenience, the circular Fresnel lens array CA is illustrated as including two rows of circular Fresnel lenses, but may include more than two rows of circular Fresnel lenses. The circular Fresnel lenses CA1, CA2, CA3, CA4, CA5, and CA6, like the circular Fresnel lenses C1 and C2 of FIG. 10, may be disposed to face the light source 400 of FIG. 1 and the LEDs 410 of FIG. 1

The width of the second optical pattern layer 60_1, 60_2, 60_3, or 60_4, like the second optical pattern layer 60 of FIG. 6, may be substantially the same as the thickness of the light guide plate 10, but the inventive concepts are not limited thereto. That is, alternatively, the width of the second optical pattern layer 60_1, 60_2, 60_3, or 60_4 may be greater than the thickness of the light guide plate 10 such that the second optical pattern layer 60_1, 60_2, 60_3, or 60_4 can cover not only the light-incident surface 10s1 of the light guide plate 10, but also the sides of the low refractive index layer 20 and the sides of the wavelength conversion layer 30.

Figure 12:
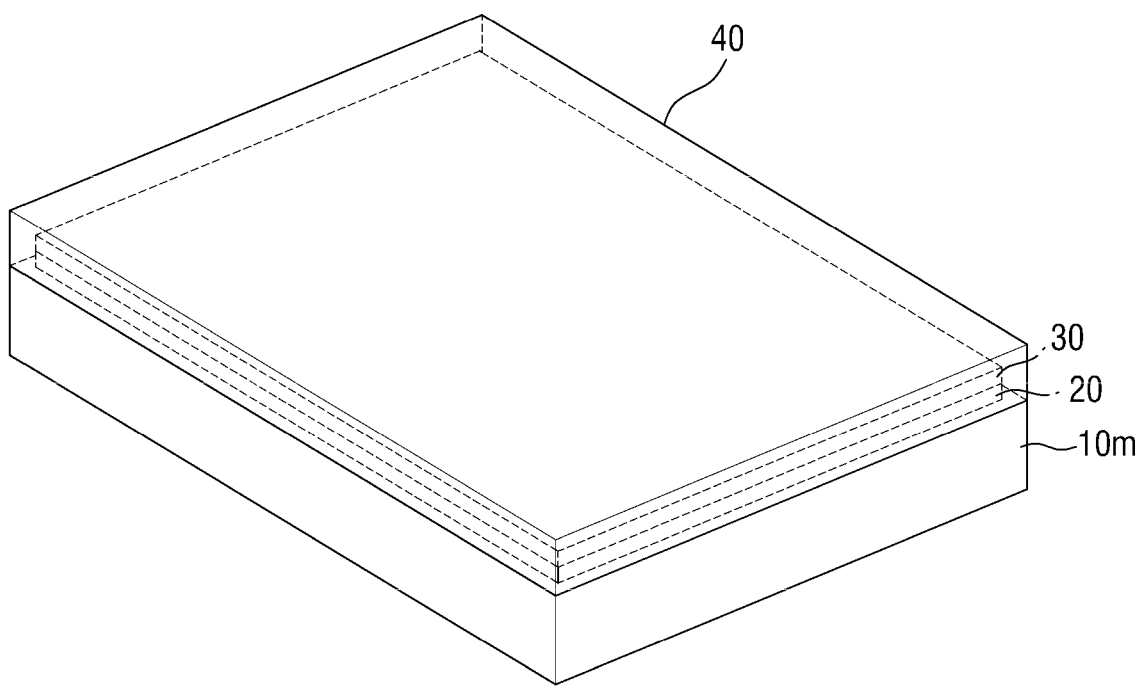
FIG. 12 and FIG. 13 are perspective views of a mother stack structure before and after being cut into nine equal pieces.
Figure 13:
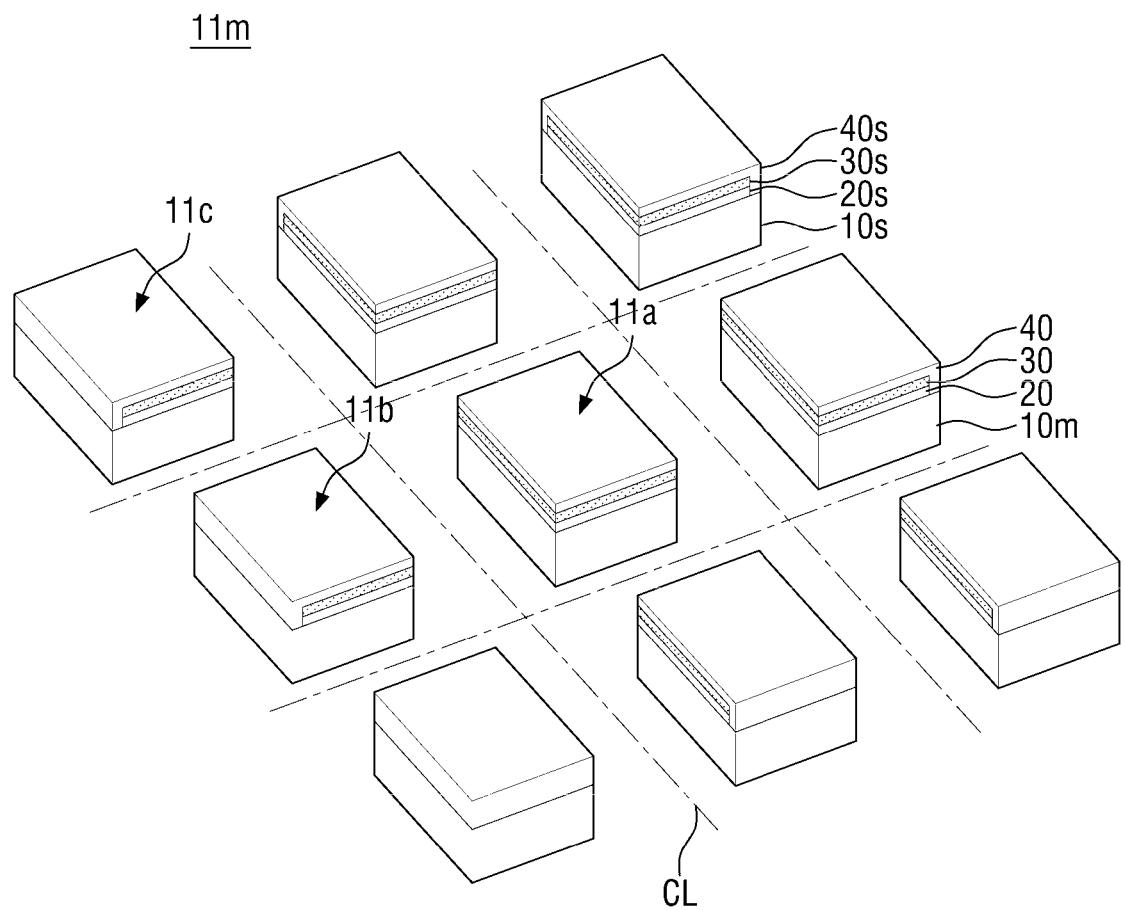

FIGS. 12 and 13 are perspective views of a mother stack structure before and after being cut into nine equal pieces.

Referring to FIGS. 12 and 13, a mother stack structure 11m may be formed by sequentially stacking a low refractive index layer 20, a wavelength conversion layer 30, and a passivation layer 40 on a mother light guide plate 10m. The mother stack structure 11m may be obtained by forming the low refractive index layer 20 and the wavelength conversion layer 30 on the mother light guide plate 10m to expose the edges of the top surface of the mother light guide plate 10 and then forming the passivation layer 40 to cover sides 20s of the low refractive index layer 20 and sides 30s of the wavelength conversion layer 30. When applied as an optical member, the mother stack structure 11m may have the same structure as the stack structure 11 of FIG. 2.

In some exemplary embodiments, individual stack structures may be obtained by forming and then cutting the mother stack structure 11m. That is, as illustrated in FIG. 13, individual stack structures 11a, 11b, and 11c may be obtained by preparing and cutting the mother stack structure 11*m*. FIG. 13 illustrates an example in which the mother stack structure 11*m* is cut, along cutting lines CL, into nine equal pieces. Cut surfaces of the mother stack structure 11*m* may have a different shape from non-cut surfaces of the mother stack structure 11*m*. The individual stack structures 11*a*, 11*b*, and 11*c* may have different side shapes depending on the number and the locations of sides thereof that form the cut surfaces. The sides 20*s* of the low refractive layer 20 and the sides 30*s* of the wavelength conversion layer 30 may be exposed on the cut surfaces.

Figure 14:
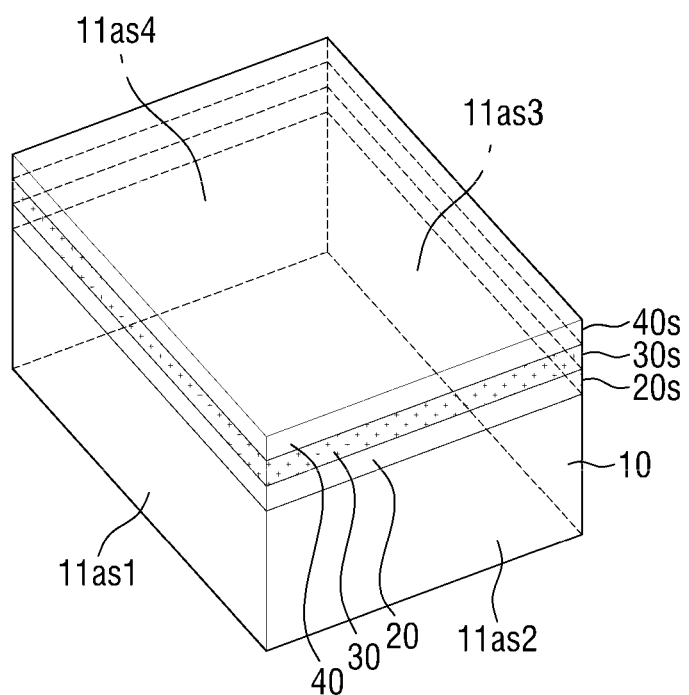
FIG. 14, FIG. 15, and FIG. 16 are perspective views of individual stack structures obtained from the mother stack structure of FIGS. 12 and 13.
Figure 15:
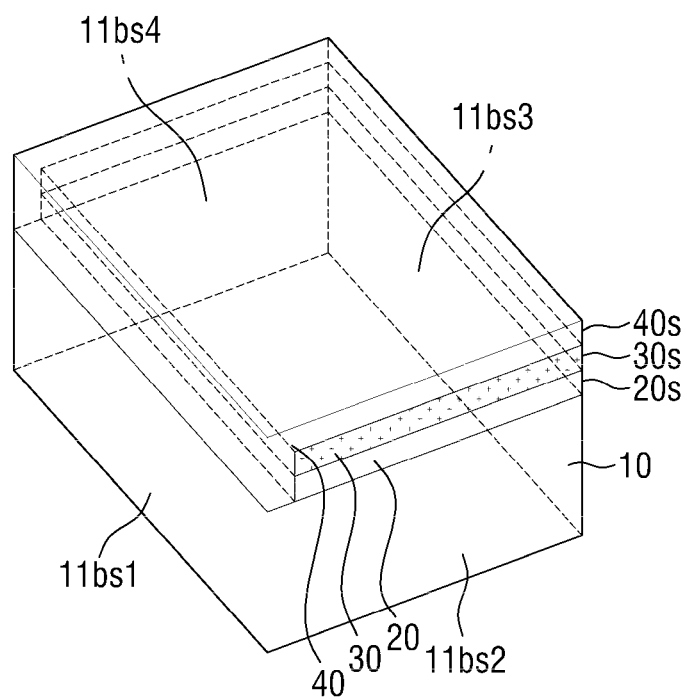
Figure 16:
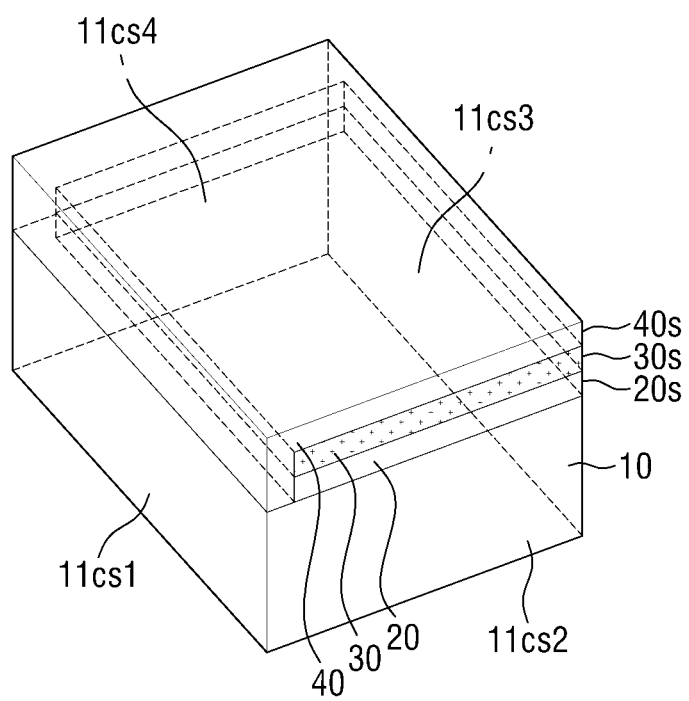

FIGS. 14 through 16 are perspective views of the individual stack structures obtained from the mother stack structure of FIGS. 12 and 13. Specifically, FIGS. 14 through 16 illustrate three types of individual stack structures among the nine individual stack structures obtained by cutting the mother stack structure of FIG. 13. Referring to FIG. 14, the individual stack structure 11*a* has four cut sides 11*as*1, 11*as*2, 11*as*3, and 11*as*4. That is, all the sides of the individual stack structure 11*a* overlap with the cut surfaces of the mother stack structure 11*m* of FIG. 13, and thus, the sides 20*s* of the low refractive index layer 20 and the sides 30*s* of the wavelength conversion layer 30 may all be exposed on the sides of the individual stack structure 11*a*, instead of being covered by the passivation layer 40. The cut sides 11*as*1, 11*as*2, 11*as*3, and 11*as*4 may include the sides 20*s* of the low refractive index layer 20 and the sides 30*s* of the wavelength conversion layer 30 and may be exposed.

Referring to FIG. 15, the individual stack structure 11*b* has three cut sides 11*bs*2, 11*bs*3, and 11*bs*4, and one non-cut side 11*bs*1. Referring to FIG. 16, the individual stack structure 11*c* has two cut sides 11*cs*1 and 11*cs*4 and two non-cut sides 11*cs*2 and 11*cs*3. Although not specifically illustrated, each individual stack structure obtained by cutting the mother stack structure 11*m* into two equal pieces may have one cut side and three non-cut sides.

Since the sides 20*s* of the low refractive index layer 20 and the sides 30*s* of the wavelength conversion layer 30 are exposed on the cut sides 11*as*1, 11*as*2, 11*as*3, and 11*as*4 of the individual stack structure 11*a*, the cut sides 11*bs*2, 11*bs*3, and 11*bs*4 of the individual stack structure 11*b*, and the cut sides 11*c*1 and 11*c*4 of the individual stack structure 11*c*, instead of being covered by the passivation layer 40, moisture and/or oxygen may penetrate the wavelength conversion layer 30 through the cut sides 11*as*1, 11*as*2, 11*as*3, and 11*as*4 of the individual stack structure 11*a*, the cut sides 11*bs*2, 11*bs*3, and 11*bs*4 of the individual stack structure 11*b*, and the cut sides 11*c*1 and 11*c*4 of the individual stack structure 11*c*, and as a result, the wavelength conversion layer 30 may deteriorate. Thus, the penetration of moisture and/or oxygen can be prevented by providing sealing structures for blocking moisture and/or oxygen on the cut sides 11*as*1, 11*as*2, 11*as*3, and 11*as*4 of the individual stack structure 11*a*, the cut sides 11*bs*2, 11*bs*3, and 11*bs*4 of the individual stack structure 11*b*, and the cut sides 11*c*1 and 11*c*4 of the individual stack structure 11*c*. Barrier films or sealing tapes may be used as the sealing structures. The sealing structures may be attached to parts of each of the individual stack structures 11*a*, 11*b*, and 11*c* that need to be sealed, for example, the cut sides 11*as*1, 11*as*2, 11*as*3, and 11*as*4 of the individual stack structure 11*a*, the cut sides 11*bs*2, 11*bs*3, and 11*bs*4 of the individual stack structure 11*b*, and the cut sides 11*c*1 and 11*c*4 of the individual stack structure 11*c*. Nearly any structures that can properly prevent the penetration of moisture and/or oxygen by covering the sides 20*s* of the low refractive index layer 20 and the sides 30*s* of the wavelength conversion layer 30 may be used as the sealing structures.

Optical members according to other exemplary embodiments of the present invention will hereinafter be described. In FIGS. 1, 2, and 17 through 21, like reference numeral indicate like elements, and thus, detailed descriptions thereof will be omitted.

Figure 17:
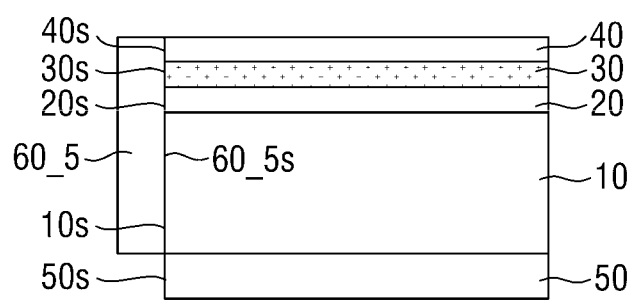
FIG. 17, FIG. 18, FIG. 19, FIG. 20, and FIG. 21 are cross-sectional views of optical members according to other exemplary embodiments of the present invention.
Figure 18:
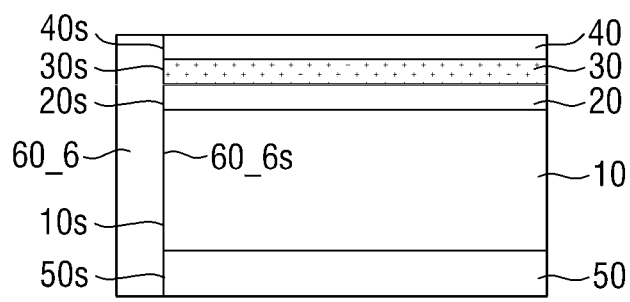

FIGS. 17 and 18 are cross-sectional views of optical members according to other exemplary embodiments of the present invention. An optical member 100_5 or 100_6 of FIG. 17 or 18 differs from the optical member 100 of FIGS. 1 and 2 in that it has a cut surface and the cut surface is covered and protected by a second optical pattern layer 60_5 or 60_6. That is, a side 20*s* of a low refractive index layer 20 and a side 30*s* of a wavelength conversion layer 30 may be exposed on the cut surface of the optical member 100_5 or 100_6. The optical members 100_5 and 100_6 will hereinafter be described, focusing mainly on differences with the optical member 100 of FIGS. 1 and 2.

Specifically, FIGS. 17 and 18 illustrate that the side 20*s* of the low refractive index layer 20 and the side 30*s* of the wavelength conversion layer 30 are covered by the second optical pattern layer 60_5 or 60_6.

Referring to FIG. 17, the second optical pattern layer 60_5 may be disposed to cover the side 20*s* of the low refractive index layer 20 and the side 30*s* of the wavelength conversion layer 30. As already mentioned above, in a case where the optical member 100_5 has a cut surface, moisture and/or oxygen may penetrate the wavelength conversion layer 30 through the side 20*s* of the low refractive index layer 20 and the side 30*s* of the wavelength conversion layer 30, and as a result, a wavelength conversion material included in the wavelength conversion layer 30 may deteriorate. An attachment surface 60_5*s* of the second optical pattern layer 60_5 may be in contact with the side 20*s* of the low refractive index layer 20 and the side 30*s* of the wavelength conversion layer 30 and may thus prevent the penetration of moisture and/or oxygen. As a result, the life of the wavelength conversion material of the wavelength conversion layer 30 can be increased, and the color reproducibility of a display device can be maintained for a long period of time.

The optical member 100_6 differs from the optical member 100_5 of FIG. 17 in that the second optical pattern layer 60_6 even covers a side 50*s* of a first optical pattern layer 50. In a case where the second optical pattern layer 60_6 covers the side 50*s* of the first optical pattern layer 50, the area of an attachment surface 60_6*s* of the second optical pattern layer 60_6 may increase. That is, the adhesiveness of the second optical pattern layer 60_6 can be improved. As a result, the second optical pattern layer 60_6 can further effectively prevent the penetration of moisture and/or oxygen into the wavelength conversion layer 30. Also, the second optical pattern layer 60_6 can be prevented from being lifted off at the attachment surface 60_6*s* thereof.

Figure 19:
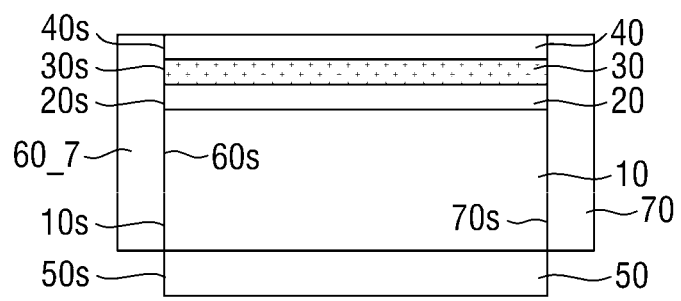
Figure 20:
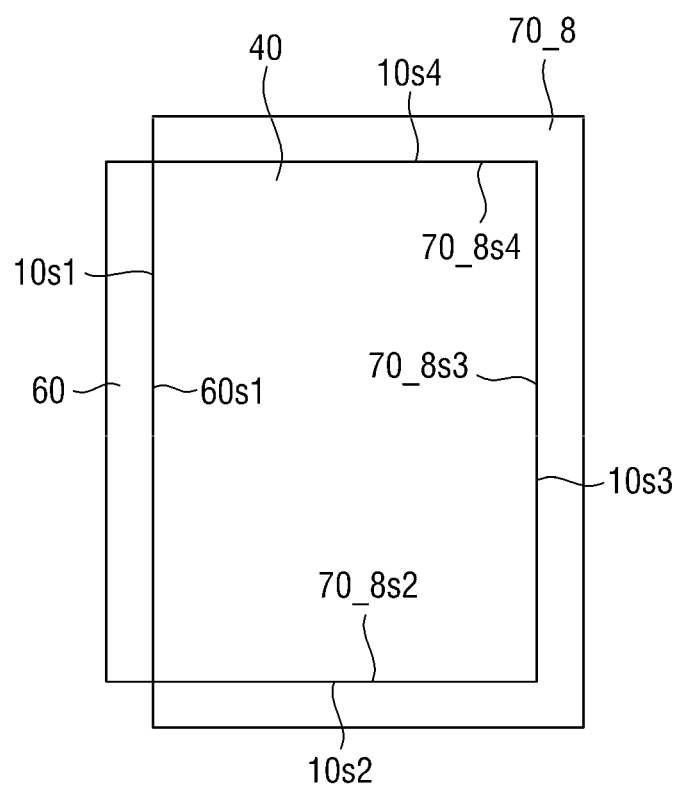

FIGS. 19 and 20 are cross-sectional views of optical members according to other exemplary embodiments of the present invention. Optical members 100_7 and 100_8 of FIGS. 19 and 20 differ from the optical member 100_5 of FIG. 17 in that they further include a tape layer 70 or 70_8. The optical members 100_7 and 100_8 of FIGS. 19 and 20 will hereinafter be described, focusing mainly on differences with the optical member 100_5 of FIG. 17.

Referring to FIG. 19, the optical member 100_7 may include the tape layer 70. The tape layer 70 may be disposed on at least one side 10*s* of a light guide plate 10. Specifically, the tape layer 70 may be disposed on a counter surface (10*s*3 of FIG. 2) of the light guide plate 10. In one exemplary embodiment, the tape layer 70 may be a sealing tape for protecting the wavelength conversion layer 30. That is, the tape layer 70 may be disposed to cover a side 20s of a low refractive index layer 20 and a side 30s of a wavelength conversion layer 30 and thus to prevent the penetration of moisture and/oxygen into the low refractive index layer 20 and the wavelength conversion layer 30. The tape layer 70 may be disposed to cover the side 10s of the light guide plate 10, the side 20s of the low refractive index layer 20, the side 30s of the wavelength conversion layer 30, and a side 40s of a passivation layer 40, but the present disclosure is not limited thereto. That is, alternatively, the tape layer 70 may not cover the side 40s of the passivation layer 40 or may further cover a side 50s of a first optical pattern layer 50.

In another exemplary embodiment, the tape layer 70 may be a reflective tape preventing light leakage at the counter surface of the light guide plate 10. The tape layer 70 may comprise a light-reflecting material and may reflect light incident thereupon. For example, the light-reflecting material may comprise silver (Ag). The light-reflecting material may be directly deposited on or coated on an attachment surface 70s of the tape layer 70. The reflective tape with Ag deposited thereon may reflect light of all wavelength bands. In another example, the tape layer 70 may have a stack of multiple layers having different refractive indexes, such as reflective polarizing films, instead of the light-reflecting material.

In yet another exemplary embodiment, the tape layer 70 may be a reflective tape comprising a yellow material. In a case where a yellow material is contained on the attachment surface 70s of the tape layer 70, the tape layer 70 can absorb blue light incident thereupon and can thus, further effectively prevent light leakage at the counter surface of the light guide plate 10.

FIG. 20 is a plan view of an optical member according to another exemplary embodiment of the present invention. In a case where an optical member has four cut surfaces, as described above with reference to FIG. 14, the penetration of moisture and/or oxygen needs to be prevented on all the sides of the optical member. FIG. 20 illustrates an optical member 100_8 in which a tape layer 70_8 is disposed on all sides 10s of a light guide plate 10, except for a light-incident surface 10s1. Referring to FIG. 20, the tape layer 70_8 may include an attachment surface 70_8s3 covering a counter surface 10s3 of the light guide plate 10 and may further include an attachment surface 70_8s2 covering a right side 10s2 of the light guide plate 10 and an attachment surface 70_8s3 covering a left side 10s4 of the light guide plate 10.

Although not specifically illustrated, in a case where a second optical pattern layer 60 is attached to the light guide plate 10 before the tape layer 70_8 is attached to the light guide plate 10, the tape layer 70_8 may be formed to extend further to cover the second optical pattern layer 60. On the other hand, in a case where the tape layer 70_8 is attached to the light guide plate 10 before the second optical pattern layer 60 is attached to the light guide plate 10, the second optical pattern layer 60 may be formed to extend further to cover the tape layer 70_8. That is, the second optical pattern layer 60 and the tape layer 70_8 may be connected to each other and may surround all the sides 10s of the light guide plate 10.

In a case where the tape layer 70_8 is disposed to cover not only the counter surface 10s3, but also the other sides 10s2 and 10s4 of the light guide plate 10, the tape layer 70_8 can further effectively prevent the penetration of moisture and/or oxygen into the optical member 100_8 and can prevent light leakage at all the sides 10s of the light guide plate 10.

Figure 21:
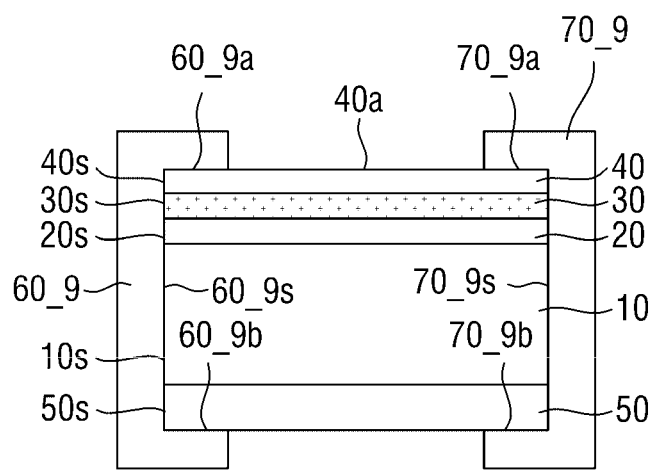

FIG. 21 is a cross-sectional view of an optical member according to another exemplary embodiment of the present invention. An optical member 100_9 of FIG. 21 differs from the optical member 100_7 of FIG. 19 in that a second optical pattern layer 60_9 and a tape layer 70_9 include folded surfaces 60_9a and 70_9a, respectively, partially covering a top surface 40a of a passivation layer 40 and further include folded surfaces 60_9b and 70_9b, respectively, partially covering the bottom surface of a first optical pattern layer 50.

Referring to FIG. 21, the second optical pattern layer 60_9 may include first and second folded surfaces 60_9a and 60_9b, and the tape layer 70_9 may include first and second folded surfaces 70_9a and 70_9b.

The first and second folded surfaces 60_9a and 60_9b may include an adhesive layer (63 of FIG. 6) and may thus increase the attachment area of the second optical pattern layer 60_9. That is, the adhesiveness of the second optical pattern layer 60_9 can be improved. A pattern layer (62 of FIG. 6) may not be formed on the first and second folded surfaces 60_9a and 60_9b. Alternatively, the pattern layer may be formed on the first and second folded surfaces 60_9a and 60_9b, but may be a flat surface with no uneven patterns (PAS of FIG. 6) formed thereon. The second optical pattern layer 60_9 can be firmly attached via the first and second folded surfaces 60_9a and 60_9b, thereby effectively preventing light leakage at a light guide plate 10 and improving a moisture/oxygen penetration prevention function.

Similarly, the first and second folded surfaces 70_9a and 70_9b may improve the adhesiveness of the tape layer 70_9. Also, a light-reflecting material may be contained even on the first and second folded surfaces 70_9a and 70_9b. As a result, light leakage in a display device can be further effectively prevented.

Figure 22:
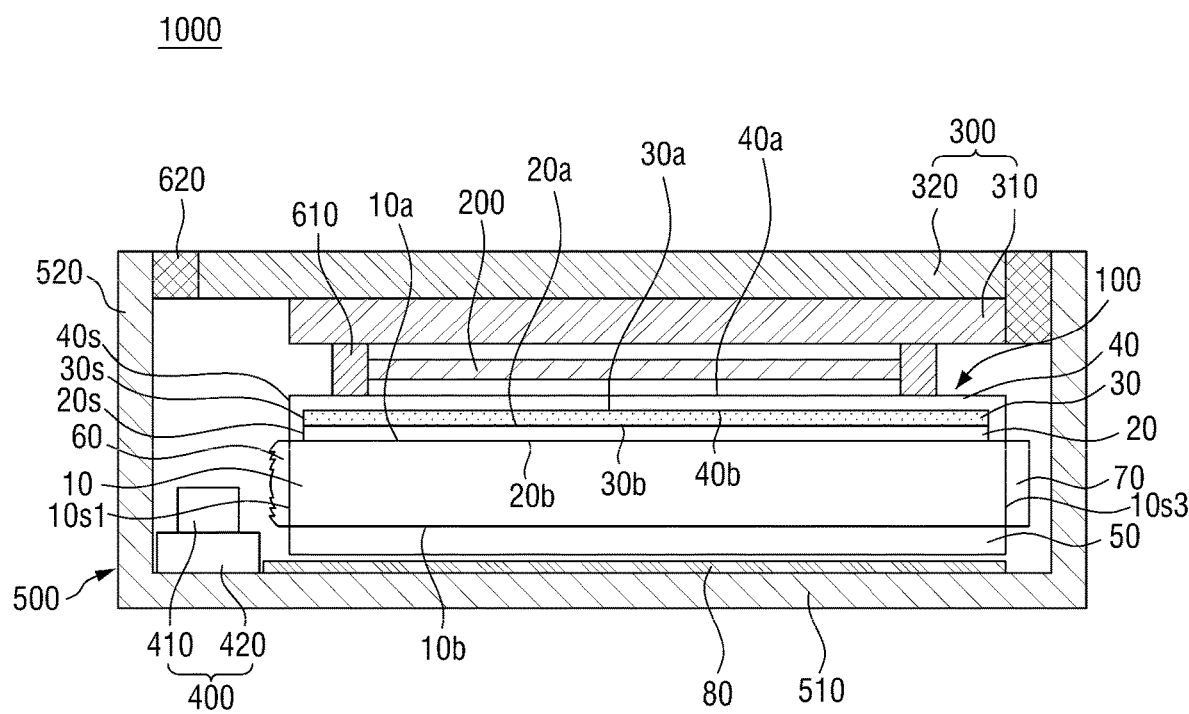
FIG. 22 is a cross-sectional view of a display device according to an exemplary embodiment of the present invention.

FIG. 22 is a cross-sectional view of a display device according to an exemplary embodiment of the present invention. A display device 1000 of FIG. 22 may include the optical member 100 of FIGS. 1 and 2, but the present disclosure is not limited thereto. That is, the other optical members according to the above-described exemplary embodiments of the present invention may also be applicable to the display device 1000.

Referring to FIG. 22, the display device 1000 includes a light source 400, the optical member 100 disposed on the path of light emitted from the light source 400, and a display panel 300 disposed above the optical member 100.

The light source 400 is disposed on one side of the optical member 100. The light source 400 may be disposed adjacent to the light-incident surface 10s1 of the light guide plate 10 of the optical member 100. The light source 400 may include a plurality of dot light source elements or a plurality of linear light source elements. As already mentioned above, the dot light source elements may be the LEDs 410. The LEDs 410 may be mounted on a printed circuit board (PCB) 420. The LEDs 410 may emit blue light.

In one exemplary embodiment, the LEDs 410 may be side-emitting LEDs emitting light on their sides, as illustrated in FIG. 22. In this exemplary embodiment, the PCB 420 may be disposed on a bottom surface 510 of a housing 500. Although not specifically illustrated, in another exemplary embodiment, the LEDs 410 may be top-emitting LEDs, in which case, the PCB 420 may be disposed on a sidewall 520 of the housing 500.

Blue light emitted from the LEDs 410 may be incident upon the light guide plate 10 of the optical member 100. The light guide plate 10 of the optical member 100 guides light and emits the guided light through the top surface 10a or the bottom surface 10b of the light guide plate 10. The wavelength conversion layer 30 of the optical member 100 converts blue-wavelength light incident upon the light guide plate 10 into light of another wavelength band, for example, green-wavelength light and red-wavelength light. The green-wavelength light and red-wavelength light are emitted upwardly together with non-converted blue-wavelength light and are thus, provided to the display panel 300.

The first optical pattern layer 50 may be disposed on the bottom surface 10b of the light guide plate 10. The first optical pattern layer 50 controls the path of light and thus, allows the light guide plate 10 to uniformly supply light to the display panel 300.

The display device 1000 may further include a reflective member 80 disposed below the optical member 100. The reflective member 80 may include a reflective film or a reflective coating layer. The reflective member 80 reflects light emitted from the bottom surface 10b of the light guide plate 10 of the optical member 10 and thus, allows the light to enter the light guide plate 10 again.

The display panel 300 is disposed above the optical member 100. The display panel 300 receives light from the optical member 100 and displays a screen using the received light. Examples of a light-receiving display panel receiving light and displaying a screen using the received light include a liquid crystal display (LCD) panel, an electrophoretic display (EPD) panel, and the like. The display panel 300 will hereinafter be described as being an LCD panel, but other various light-receiving display panels may also be applicable to the display device 1000.

The display panel 300 may include a first substrate 310, a second substrate 320 facing the first substrate 310, and a liquid crystal layer (not illustrated) disposed between the first and second substrates 310 and 320. The first and second substrates 310 and 320 may overlap with each other. In one exemplary embodiment, one of the first and second substrates 310 and 320 may be larger in size than, and may thus protrude beyond, the other substrate. The second substrate 320 is illustrated as being larger than the first substrate 310 and protruding beyond the first substrate 310 on a side thereof where the light source 400 is disposed. The protruding part of the second substrate 320 may provide a space in which a driving chip or an external PCB is mounted. Alternatively, the first substrate 310 may be larger than, and may thus protrude beyond, the second substrate 320. Part of the display panel 300 except for the protruding part of the second substrate 320 may be substantially aligned with the sides 10s of the light guide plate 10 of the optical member 100.

The optical member 100 may be coupled to the display panel 300 via an inter-module coupling member 610. The inter-module coupling member 610 may be formed as a rectangular frame in a plan view. The inter-module coupling member 610 may be disposed along the edges of each of the display panel 300 and the optical member 100.

In one exemplary embodiment, the bottom surface of the inter-module coupling member 610 may be disposed on the top surface of the passivation layer 40 of the optical member 100. The bottom surface of the inter-module coupling member 610 may overlap with the top surface 30a of the wavelength conversion layer 30, but not with the sides 30s of the wavelength conversion layer 30, over the passivation layer 40.

The inter-module coupling member 610 may include a polymer resin or an adhesive tape.

In some exemplary embodiments, the inter-module coupling member 610 may additionally serve as a pattern for blocking the transmission of light. For example, the inter-module coupling member 610 may comprise a light-absorbing material such as a black pigment or dye and may thus block the transmission of light.

The display device 1000 may further include the housing 500. The housing 500 may have one surface opened and may include the bottom surface 510 and sidewalls 520 connected to the bottom surface 510. In a space defined by the bottom surface 510 and the sidewalls 520, the light source 400, the assembly of the optical member 100 and the display panel 300, and the reflective member 80 may be received. The light source 400, the reflective member 80, and the assembly of the optical member 100 and the display panel 300 may be disposed on the bottom surface 510 of the housing 500. The height of the sidewalls 520 of the housing 500 may be substantially the same as the height of the assembly of the optical member 100 and the display panel 300. The display panel 300 may be disposed adjacent to upper ends of the sidewalls 520 of the housing 500 and may be coupled to the sidewalls 520 via a housing coupling member 620. The housing coupling member 620 may be formed as a rectangular frame in a plan view. The housing coupling member 620 may comprise a polymer resin or an adhesive tape.

The display device 1000 may further include at least one optical film 200. The optical film 200 may be provided between the optical member 100 and the display panel 300 and may be received in a space surrounded by the inter-module coupling member 610. The sides of the optical film 200 may be in contact with, and attached to, the inner sides of the inter-module coupling member 610. The optical film 200 and the optical member 100 are illustrated as having a gap therebetween, and the optical film 200 and the display panel 300 are also illustrated as having a gap therebetween. However, the gaps between the optical film 200 and the optical member 100 and between the optical film 200 and the display panel 200 are not required.

The optical film 200 may be a prism film, a diffusion film, a micro-lens film, a lenticular film, a polarizing film, a reflective polarizing film, or a phase difference film. The display device 1000 may include a plurality of optical films 200 that may be of the same type or different types. In this case, the plurality of optical films 200 may be disposed to overlap with one another, and the sides of each of the plurality of optical films 200 may be in contact with, and attached to, the inner sides of the inter-module coupling member 610. The plurality of optical films 200 may be spaced apart from one another, and an air layer may be interposed between the plurality of optical films 200.

According to the aforementioned and other exemplary embodiments of the present invention, light leakage at a light-incident part can be improved using a Fresnel lens attached to a light-incident surface, and as a result, the luminance of a display device can be improved. In addition, since the Fresnel lens covers a wavelength conversion layer, the deterioration of a wavelength conversion material included in the wavelength conversion layer can be prevented.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member comprising:
a light guide plate having a first refractive index;

a low refractive index layer disposed on a top surface of the light guide plate and having a second refractive index;
a wavelength conversion layer disposed on a top surface of the low refractive index layer;
a first optical pattern layer disposed on a bottom surface of the light guide plate; and
a second optical pattern layer disposed to cover a light-incident surface of the light guide plate,
wherein:
the second refractive index is lower than the first refractive index; and
the second optical pattern layer comprises a focusing lens structure.

2. The optical member of claim 1, wherein:
the second optical pattern layer comprises a base layer and a pattern layer disposed on the base layer and comprises the focusing lens structure; and
the pattern layer has a convex surface and a plurality of uneven patterns.

3. The optical member of claim 2, wherein:
the convex surface is disposed to overlap with a center of the pattern layer; and
the uneven patterns are arranged in series at a constant pitch, starting from both edges of the convex surface.

4. The optical member of claim 3, wherein the pattern layer comprises the convex surface and a Fresnel lens structure having the uneven patterns.

5. The optical member of claim 4, wherein the Fresnel lens structure is a linear Fresnel lens structure.

6. The optical member of claim 5, wherein:
the second optical pattern layer is disposed to further cover a first side of the wavelength conversion layer; and
the first side of the wavelength conversion layer is aligned with the light-incident surface.

7. The optical member of claim 6, further comprising a tape layer covering a counter surface of the light guide plate that is opposite to the light-incident surface,
wherein the tape layer contains a light-reflecting material.

8. The optical member of claim 7, wherein:
the tape layer is disposed to cover a second side of the wavelength conversion layer that is opposite to the first side of the wavelength conversion layer; and
the second side of the wavelength conversion layer is aligned with the counter surface.

9. The optical member of claim 8, wherein the tape layer is disposed to cover all sides of the light guide plate except for the light-incident surface.

10. The optical member of claim 9, wherein the second optical pattern layer and the tape layer are in contact with each other.

11. The optical member of claim 8, wherein the second optical pattern layer comprises:
a first folded surface extending from one side of the light-incident surface to cover a top surface of the wavelength conversion layer; and
a second folded surface extending from the other side of the light-incident surface to cover a bottom surface of the first optical pattern layer.

12. The optical member of claim 11, wherein the tape layer comprises:
a third folded surface extending from one side of the counter surface to cover a top surface of the wavelength conversion layer; and
a fourth folded surface extending from the other side of the counter surface to cover a bottom surface of the first optical pattern layer.

13. The optical member of claim 5, wherein the second optical pattern layer is disposed to further cover a side of the first optical pattern layer.

14. The optical member of claim 4, wherein the Fresnel lens structure is a circular Fresnel lens structure.

15. The optical member of claim 14, wherein the second optical pattern layer comprises a Fresnel lens array having a plurality of circular Fresnel lens structures.

16. A display device comprising:
an optical member comprising:
a light guide plate having a first refractive index;
a low refractive index layer disposed on a top surface of the light guide plate and having a second refractive index;
a wavelength conversion layer disposed on a top surface of the low refractive layer;
a first optical pattern layer disposed on a bottom surface of the light guide plate; and
a second optical pattern layer disposed to cover a light-incident surface of the light guide plate;
a light source disposed on at least one side of the light guide plate; and
a display panel disposed above the optical member,
wherein:
the second optical pattern layer comprises a focusing lens structure; and
the second refractive index is lower than the first refractive index.

17. The display device of claim 16, wherein:
the light source is configured to emit blue light; and
the wavelength conversion layer comprises:
first wavelength conversion particles converting the blue light into red light; and
second wavelength conversion particles converting the blue light into green light.

18. The display device of claim 17, wherein the focusing lens structure is a linear Fresnel lens structure.

19. The display device of claim 18, wherein:
the second optical pattern layer is disposed to further cover a first side of the wavelength conversion layer; and
the first side of the wavelength conversion layer is aligned with the light-incident surface.

20. The display device of claim 19, further comprising a tape layer covering a counter surface of the light guide plate that is opposite to the light-incident surface,
wherein:
the tape layer comprises a light-reflecting material and is disposed to further cover a second side of the wavelength conversion layer that is opposite to the first side of the wavelength conversion layer; and
the second side of the wavelength conversion layer is aligned with the counter surface.

* * * * *